(12) United States Patent
Masaki et al.

(10) Patent No.: US 10,553,249 B2
(45) Date of Patent: Feb. 4, 2020

(54) STORAGE MEDIUM, INFORMATION PROCESSING APPARATUS, INFORMATION PROCESSING SYSTEM AND INFORMATION PROCESSING METHOD

(71) Applicant: NINTENDO CO., LTD., Kyoto (JP)

(72) Inventors: Yoshifumi Masaki, Kyoto (JP); Hirohito Shinoda, Kyoto (JP); Naoki Yamada, Kyoto (JP); Takehisa Eiraku, Kyoto (JP); Takeshi Tateishi, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 0 days.

(21) Appl. No.: 16/027,534

(22) Filed: Jul. 5, 2018

(65) Prior Publication Data
US 2019/0198056 A1    Jun. 27, 2019

(30) Foreign Application Priority Data

Dec. 26, 2017    (JP) .................................. 2017-249931

(51) Int. Cl.
*G11B 27/00*   (2006.01)
*G11B 27/10*   (2006.01)
*G11B 27/34*   (2006.01)
*G06F 3/041*   (2006.01)

(52) U.S. Cl.
CPC .......... *G11B 27/005* (2013.01); *G11B 27/102* (2013.01); *G11B 27/34* (2013.01); *G06F 3/041* (2013.01)

(58) Field of Classification Search
CPC ..... G11B 27/005; G11B 27/102; G11B 27/34; G06F 3/041
See application file for complete search history.

(56) References Cited

U.S. PATENT DOCUMENTS

| | | | | |
|---|---|---|---|---|
| 5,202,961 A | * | 4/1993 | Mills .................... | G06F 3/0481 345/157 |
| 5,319,466 A | * | 6/1994 | Gedl .................... | H04N 9/8715 386/204 |
| 8,341,544 B2 | * | 12/2012 | Kerr ................... | H04N 5/44513 715/786 |
| 9,721,383 B1 | * | 8/2017 | Horowitz ............... | G06T 17/20 |
| 2007/0003214 A1 | * | 1/2007 | Toyoda ............... | G06F 3/04847 386/344 |

(Continued)

FOREIGN PATENT DOCUMENTS

JP    2005-190217    7/2005

OTHER PUBLICATIONS

Parial European Search Report dated Feb. 18, 2019 issued in EP Application No. 18184200.6 (13 pgs.).

*Primary Examiner* — Mishawn N. Hunter
(74) *Attorney, Agent, or Firm* — Nixon & Vanderhye, P.C.

(57) ABSTRACT

A non-limiting information processing apparatus includes a processor, and the processor acquires a touch coordinate from an input device, and when a state is changed from a touch-off to a touch-on, plays an animation or video based on a touch position of the touch-on. Moreover, the processor changes, if detecting a slide when playing the animation or video, a speed of playing the animation or video based on a magnitude of the slide. The processor pauses playing of the animation or video if the touch-off is detected when playing the animation or video.

22 Claims, 20 Drawing Sheets

(56) References Cited

U.S. PATENT DOCUMENTS

| | | | |
|---|---|---|---|
| 2010/0225582 A1* | 9/2010 | Ohta | A63F 13/02 |
| | | | 345/158 |
| 2012/0028704 A1* | 2/2012 | Arakawa | G07F 17/3211 |
| | | | 463/31 |
| 2016/0291860 A1* | 10/2016 | Higuchi | G06F 3/04883 |
| 2018/0005431 A1* | 1/2018 | Yoshioka | G06T 15/205 |

* cited by examiner

MANUAL DISPLAY SCREEN 100

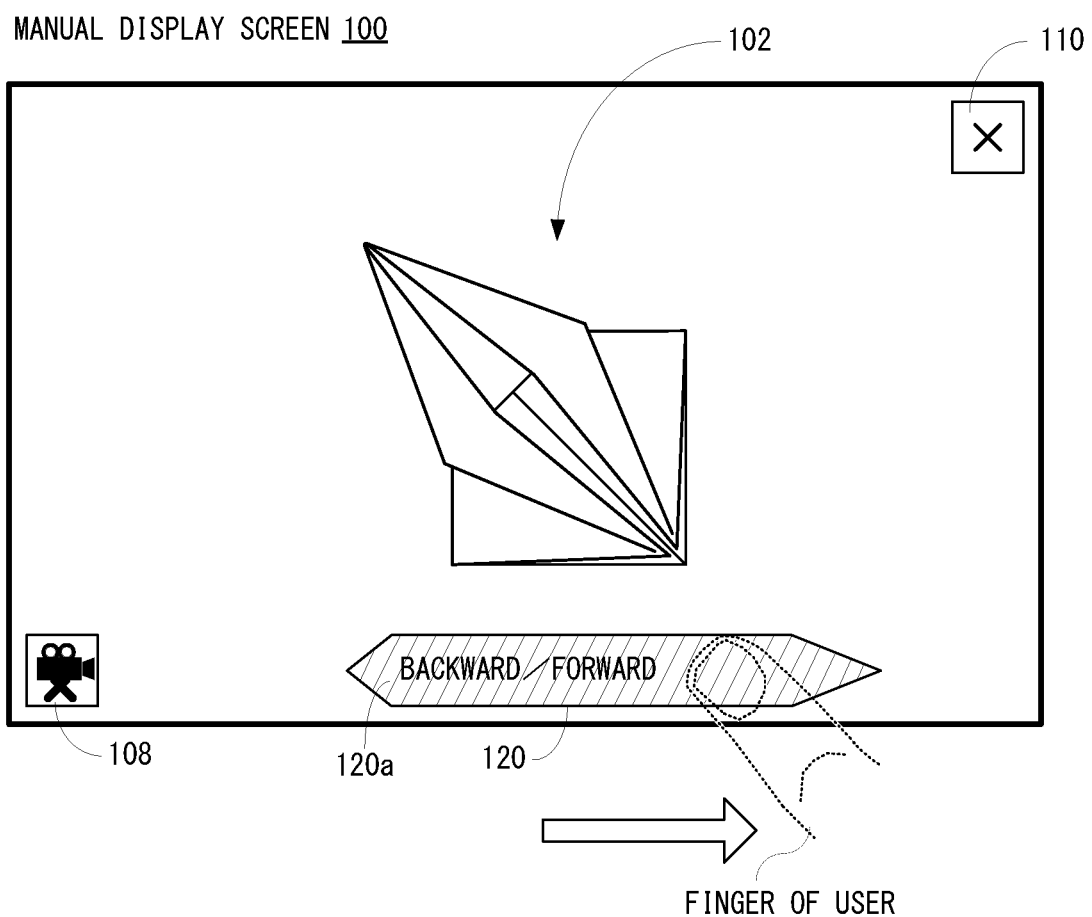

STORAGE MEDIUM, INFORMATION PROCESSING APPARATUS, INFORMATION PROCESSING SYSTEM AND INFORMATION PROCESSING METHOD

CROSS REFERENCE OF RELATED APPLICATION

The disclosure of Japanese Patent Application No. 2017-249931 filed on Dec. 26, 2017 is incorporated herein by reference.

FIELD

This application describes a storage medium, an information processing apparatus, an information processing system and an information processing method, displaying an animation or video on a display.

SUMMARY

It is a primary object of an embodiment(s) to provide a novel storage medium, information processing apparatus, information processing system and information processing method.

Moreover, it is another object of the embodiment(s) to provide a storage medium, information processing apparatus, information processing system and information processing method, capable of increasing operability.

A first embodiment is a non-transitory computer readable storage medium storing an information processing program, wherein the information processing program causes one or more processors of a computer to perform: a continuation step; an operation determination step; and an action step. The continuation step is configured to continuously play an animation or video on a surface of a display. The operation determination step is configured to determine whether an operation for playing by a user is performed by an input device. Then, the action step is configured to make playing by the continuation step continue until it is determined by the operation determination step that the operation for playing by the user is no longer performed. For example, the action step makes the playing by the continuation step continue until it is changed from a state determining that the operation for playing by the user is performed in the operation determination step to a state where the operation concerned is not performed.

According to the first embodiment, since the animation or video is played only when the operation for playing is performed, an operation is simple. Therefore, it is possible to increase operability.

A second embodiment is the storage medium according to the first embodiment, wherein the action step is configured to pause, when the playing is being continued by the continuation step, the playing by the continuation step when it is determined in the operation determination step that the operation for playing by the user is not performed.

According to the second embodiment, since the playing of the animation or video is made to be paused if the operation for playing is not performed, the user should just stop the operation for playing. That is, it is possible to increase operability.

A third embodiment is the storage medium according to the first embodiment, wherein the action step is configured to start the playing by the continuation step when it is changed from a state where it is determined in the operation determination step that the operation for playing by the user is not performed by the input device to a state where it is determined that the operation for playing by the user is performed.

A fourth embodiment is the storage medium according to the first embodiment, wherein the input device includes a pointing device configured to designate a position on the surface of the display by the user.

A fifth embodiment is the storage medium according to the fourth embodiment, wherein the information processing program further causes the one or more processors to perform an operation area setting step configured to set an operation area for receiving the operation for playing by the user within the surface of the display. The operation determination step is configured to determine that the operation for playing by the user is performed when a designated position designated by the pointing device is included in the operation area that is set in the operation area setting step.

A sixth embodiment is the storage medium according to the fifth embodiment, wherein the operation determination step is configured to determine that the operation for playing by the user is performed when it is determined that the designated position is changed after it is determined that the designated position is included in the operation area.

A seventh embodiment is the storage medium according to the fifth embodiment, wherein the information processing program further causes the one or more processors to perform a UI display step configured to display a UI at a position on the surface of the display related to the operation area.

An eighth embodiment is the storage medium according to the seventh embodiment, wherein the information processing program further causes the one of more processors to perform a change determination step configured to determine whether the designated position is changed after it is determined in the operation determination step that the operation for playing by the user is performed; and a speed changing step configured to change a speed of playing the animation or video when it is determined in the change determination step that there is change of the designated position.

According to the eighth embodiment, it is possible to change the speed only by changing the designated position after the operation for playing of the animation or video is performed.

A ninth embodiment is the storage medium according to the eighth embodiment, wherein the speed changing step is configured to make the speed of playing the animation or video be changed based on the designated position after change. For example, the speed of playing the animation or video is changed based on an absolute positional relationship of the designated position to a reference position.

A tenth embodiment is the storage medium according to the eighth embodiment, wherein the speed changing step is configured to make the speed of playing the animation or video be changed based on a magnitude of the change of the designated position.

According to the tenth embodiment, it is also simple to change the speed of playing the animation or video.

An eleventh embodiment is the storage medium according to the eighth embodiment, wherein the information processing program further causes the one or more processors to perform a first deformation step configured to deform the UI when it is determined in the change determination step that there is the change in the designated position.

According to the eleventh embodiment, since the UI is changed, it is possible to easily know that the speed of playing the animation or video is changed.

A twelfth embodiment is the storage medium according to the eleventh embodiment, wherein the information processing program further causes the one or more processors to perform a second deformation step configured to further deform the UI having been deformed in the first deformation step when it is determined in the operation determination step that the operation for playing by the user by the pointing device is not performed.

According to the twelfth embodiment, it is possible to also know having changed to a state where the operation for playing of the animation or video is not performed by the change of the UI.

A thirteenth embodiment is the storage medium according to the eleventh embodiment, wherein the first deformation step is configured to deform the UI by lengthening the UI when it is determined in the change determination step that there is the change in the designated position.

According to the thirteenth embodiment, since the UI is lengthened, it is possible to know easily that the speed of playing the animation or video is changed.

A fourteenth embodiment is the storage medium according to the thirteenth embodiment, wherein the second deformation step is configured to deform the UI that is lengthened in the first deformation step by shortening the UI when it is determined in the operation determination step that the operation for playing by the user by the pointing device is not performed.

According to the fourteenth embodiment, since the UI having been lengthened is shortened, it is possible to know that the change of the speed of playing the animation or video is disappeared, or that a change amount of the speed is reduced.

A fifteenth embodiment is the storage medium according to the first embodiment, wherein the continuation step is configured to continuously play or reversely play the animation or video on the surface of the display.

According to the fifteenth embodiment, it is easy to operate reverse playing of the animation or video like forward playing of the animation or video.

A sixteenth embodiment is the storage medium according to the first embodiment, wherein the information processing program further causes the one or more processors to perform: an image display step configured to display on the surface of the display an image indicative of a virtual space that is imaged by a virtual camera arranged in the virtual space; and a virtual camera control step configured to control the virtual camera based on a virtual camera control operation related to control of the virtual camera. The operation determination step is configured to further determine whether the virtual camera control operation by the user is performed by the input device, and the virtual camera control step is configured to control the virtual camera when it is determined in the operation determination step that the virtual camera control operation is performed.

According to the sixteenth embodiment, since the virtual camera can be controlled, for example, it is possible to view the animation from various angles, or while enlarging or reducing the animation.

A seventeenth embodiment is the storage medium according to the sixteenth embodiment, wherein the operation determination step is configured to determine whether a reset operation to reset the virtual camera by the user by the input device is performed, and the virtual camera control step is configured to control a position and a magnification of the virtual camera to a reference position and a reference magnification in response to having been performed the reset operation.

According to the seventeenth embodiment, since the virtual camera can be returned to the reference position and the reference magnification by resetting even if the position and the magnification of the virtual camera are changed, the operation is simple.

An eighteenth embodiment is the storage medium according to the first embodiment, wherein the input device includes a touch panel that receives a touch input by the user, and the information processing program further causes the one or more processors to perform an input acquisition step configured to acquire input data according to the touch input, and the operation determination step is configured to determine whether the operation for playing by the user is performed based on the input data acquired in the input acquisition step.

A nineteenth embodiment is the storage medium according to the eighth embodiment, wherein the information processing program further causes the one or more processors to perform a put-forward step configured to put-forward the animation in the UI when it is determined in the change determination step that there is the change in the designated position.

According to the nineteenth embodiment, since the animation in the UI is put-forward, it is possible to easily know that the speed of the animation that may be provided as a manual is changed by the animation in the UI.

A twentieth embodiment is an information processing apparatus, comprising: a continuation portion configured to continuously play an animation or video on a surface of a display; an operation determination portion configured to determine whether an operation for playing by a user is performed by an input device; and an operation portion configured to make playing by the continuation portion continue until it is determined by the operation determination portion that the operation for playing by the user is no longer performed.

A twenty-first embodiment is an information processing system, comprising: a continuation portion configured to continuously play an animation or video on a surface of a display; an operation determination portion configured to determine whether an operation for playing by a user is performed by an input device; and an operation portion configured to make playing by the continuation portion continue until it is determined by the operation determination portion that the operation for playing by the user is no longer performed.

A twenty-second embodiment is an information processing method, comprising steps of: (a) continuously playing an animation or video on a surface of a display; (b) determining whether an operation for playing by a user is performed by an input device; and (c) making playing by the step (a) continue until it is determined in the step (b) that the operation for playing by the user is no longer performed.

The above described objects and other objects, features, aspects and advantages of the embodiment(s) will become more apparent from the following detailed description when taken in conjunction with the accompanying drawings.

BRIEF DESCRIPTION OF THE DRAWINGS

FIG. 20 is an illustration view showing a non-limiting eleventh example manual display screen to be displayed on the display of the information processing apparatus shown in FIG. 1.

DETAILED DESCRIPTION OF NON-LIMITING EXAMPLE EMBODIMENTS

Figure 1:
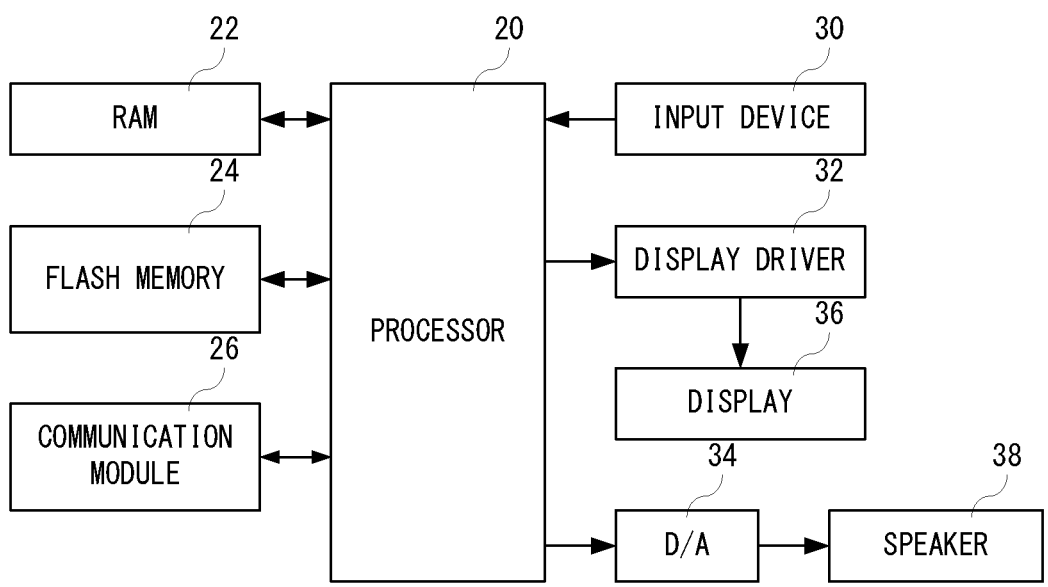
FIG. 1 is a block diagram showing non-limiting example electric structure of an information processing apparatus.

With reference to FIG. 1, a non-limiting example information processing apparatus 10 includes a processor 20, and the processor 20 is connected with a RAM 22, a flash memory 24, a communication module 26, an input device 30, a display driver 32 and a D/A converter 34. Moreover, a display 36 is connected to the display driver 32, and a speaker 38 is connected to the D/A converter 34. The processor 20 is in charge of overall control of the information processing apparatus 10. Specifically, the processor 20 is an SoC (System-on-a-Chip) incorporating functions of a CPU and a GPU. The RAM 22 is a volatile storage medium, and is used as a working memory and a buffer memory for the processor 20. The flash memory 24 is a nonvolatile storage medium, and used in order to store various kinds of application programs, and store (save) various kinds of data. For example, an application program and necessary data are read out from the flash memory 24 to be stored in the RAM 22.

However, the applications correspond to applications related to various kinds of information processing, such as a manual display application, a game application, a document creation application, an email application, a drawing application, a character practice application, a language training application, a learning application, etc.

The communication module 26 has a function to access a wireless LAN by a system conforming to the standard of IEEE802.11.b/g, for example. Therefore, for example, the processor 20 transmits or receives data to or from other equipment via an access point and a network such as Internet with using the communication module 26. For example, other equipment may be computers or other information processing apparatuses 10. However, it is also possible to transmit or receive data to or from other equipment directly with using the communication module 26.

However, the communication module 26 may have a function to perform short-distance wireless communication different from the function to access the wireless LAN. Specifically, the communication module 26 has a function to transmit or receive an infrared signal to or from other equipment with a predetermined communication system (infrared system, for example), and a function to perform wireless communication with the same or similar type of information processing apparatus according to a predetermined communication protocol (multilink protocol, for example). In this case, for example, the processor 20 can transmit or receive data to or from the same or similar type of other image forming apparatuses directly with using the communication module 26. However, instead of the short-distance wireless communication of an infrared system, short-distance wireless communication according to other wireless-communication standards such as Bluetooth (registered trademark) may be performed.

The input device 30 includes a touch panel and various kinds of push buttons or switches provided on the information processing apparatus 10, and is used by a user various kinds of operations such as menu selection, instructions in the application, etc. However, as the input device 30, a pointing device such as a computer mouse other than a touch panel, an input means such as a microphone, a camera, etc.

may be provided instead of the touch panel and the push buttons, or in addition to the touch panel and the push buttons. Moreover, a touch panel may be integrally formed with the display 36 described later. The display 36 in this case is a touch panel integral type display.

The display driver 32 is used in order to display various kinds of images such as a manual image, etc. on the display 36 under instructions of the processor 20. Although illustration is omitted, the display driver 32 incorporates a video RAM.

The D/A converter 34 converts sound data applied from the processor 20 into an analog sound signal to output to the speaker 38. However, the sound data may be data concerning a sound generated by a character or object, sound effects, BGM, etc.

In addition, the electric structure of the information processing apparatus 10 shown in FIG. 1 is a mere example, and it does not need to be limited to this. For example, the communication module 26 may be dispensed with.

Figure 2:
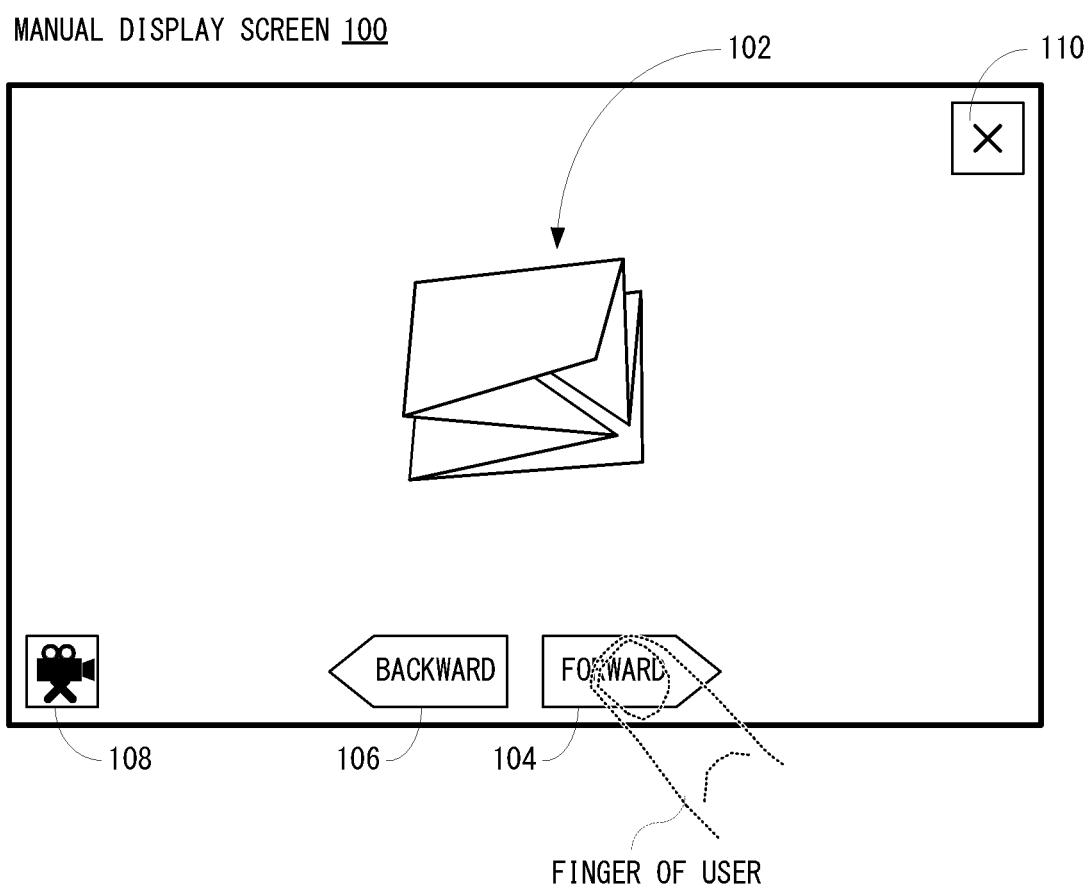
FIG. 2 is an illustration view showing a non-limiting first example manual display screen to be displayed on a display of the information processing apparatus shown in FIG. 1.

FIG. 2 shows a non-limiting example manual display screen 100 to be displayed on the display 36 of the information processing apparatus 10 shown in FIG. 1.

In this embodiment, a user causes the display 36 to display the manual display screen 100 shown in FIG. 2 etc., and learns a folding method of an origami by rotating or deforming an origami object 102 being displayed on the manual display screen 100 by playing or reversely playing an animation of the origami object 102, thereby to complete a predetermined shape or form by folding the origami according to the learned folding method. It should be noted that the predetermined shape or form (hereinafter, called a "completed shape") may be various forms, such as animals and plants, tools, characters, etc. The manual display screen 100 of this embodiment shown in FIG. 2-FIG. 8, FIG. 10 and FIG. 11 shows respective parts of a folding method of a crane.

As shown in FIG. 2, the origami object 102 is displayed on the manual display screen 100. The origami object 102 is shown by an animation with its deformed manner according to an operation by the user. Therefore, how to fold an origami, that is, an origami folding method is taught to the user. An icon 104 and an icon 106 are displayed as a user interface image for playing (hereinafter, referred to as "UI"), below the origami object 102, at the center of a lower end of the manual display screen 100. The icon 104 is an image of a button for putting-forward the animation of the origami object 102 by playing the animation. The icon 106 is an image of a button for putting-backward the animation of the origami object 102 by reversely playing the animation. When a speed is not changed in playing or reversely playing the animation of the origami object 102, as patterns of the icon 104 and the icon 106 (hereinafter, referred to as "normal pattern"), letters of "forward" or "backward" are described with a background of a predetermined color.

Moreover, as another UI different from the UI for playing, an icon 108 is displayed in a left lower corner of the manual display screen 100, and an icon 110 is displayed in a right upper corner of the manual display screen 100. The icon 108 is an image of a button for setting a position and a magnification of a virtual camera 202 (see FIG. 9) that is arranged in a virtual space in order to display the manual display screen 100 to a reference position and a reference magnification. The icon 110 is an image of a button for closing the manual display screen 100 to end manual display processing.

In case of displaying the manual display screen 100 on the display 36, the reference position and the reference magnification of the virtual camera 202 are set to a position and a magnification of the virtual camera 202, which the developer etc. consider that it is possible to show the origami object 102 and the folding method of the origami object 102 to the user with an easy to understand size and from an easy to understand direction.

Although illustration is omitted, each of the icons 104-110 is set with an area (hereinafter, referred to as "operation area") for determining whether it is operated. Normally, an operation area having a form and size equal to or slightly larger than a form and size of each of the icons 104-110 is set. However, the operation area of the icon 104 may be set with a quadrangle including the icon 104. Similarly, the operation area of the icon 106 may be set with a quadrangle including the icon 106.

In addition, unlike the origami object 102, the icons 104-110 are respectively drawn in predetermined positions on different layers on the front of the origami object 102. Therefore, as described later, even if the origami object 102 is rotated, or enlarged or reduced, the display positions and sizes of the icons 104-110 are not changed. However, in this embodiment, when changing a speed of playing the animation of the origami object 102, the shapes and sizes of the icon 104 and the icon 106 are changed.

Figure 3:
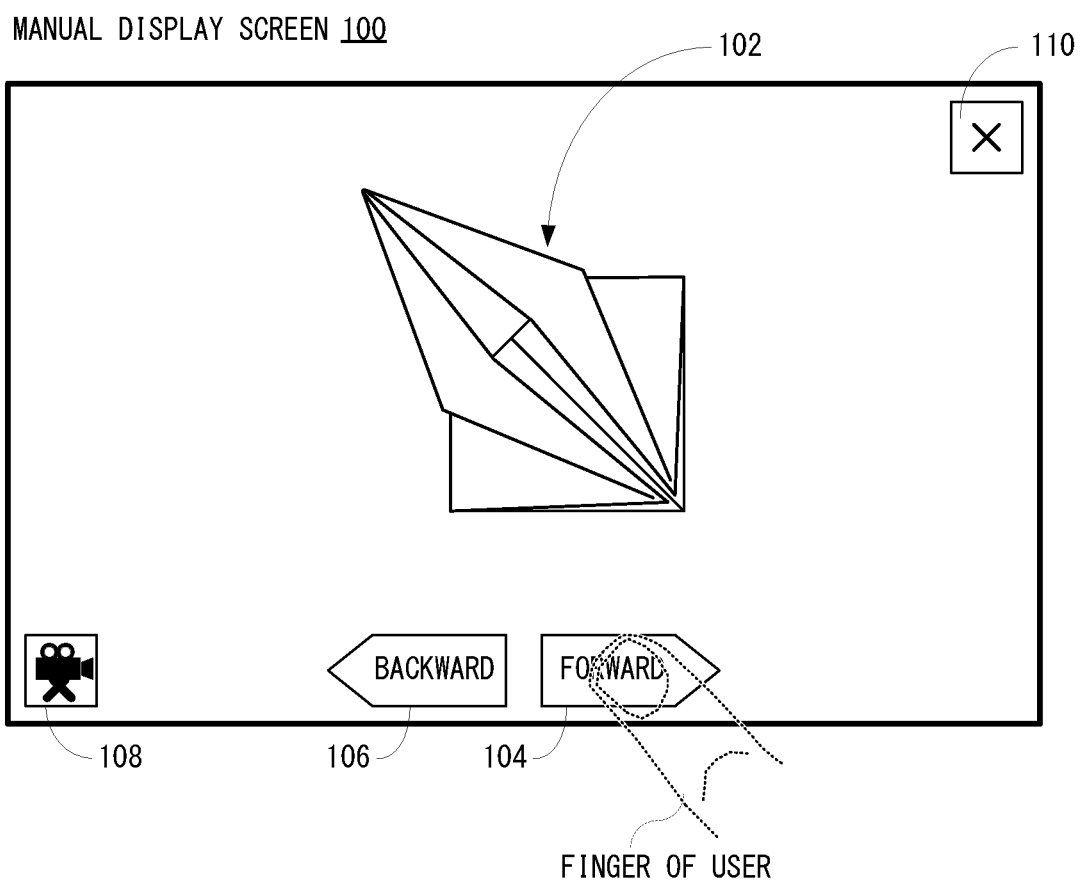
FIG. 3 is an illustration view showing a non-limiting second example manual display screen to be displayed on the display of the information processing apparatus shown in FIG. 1.
Figure 4:
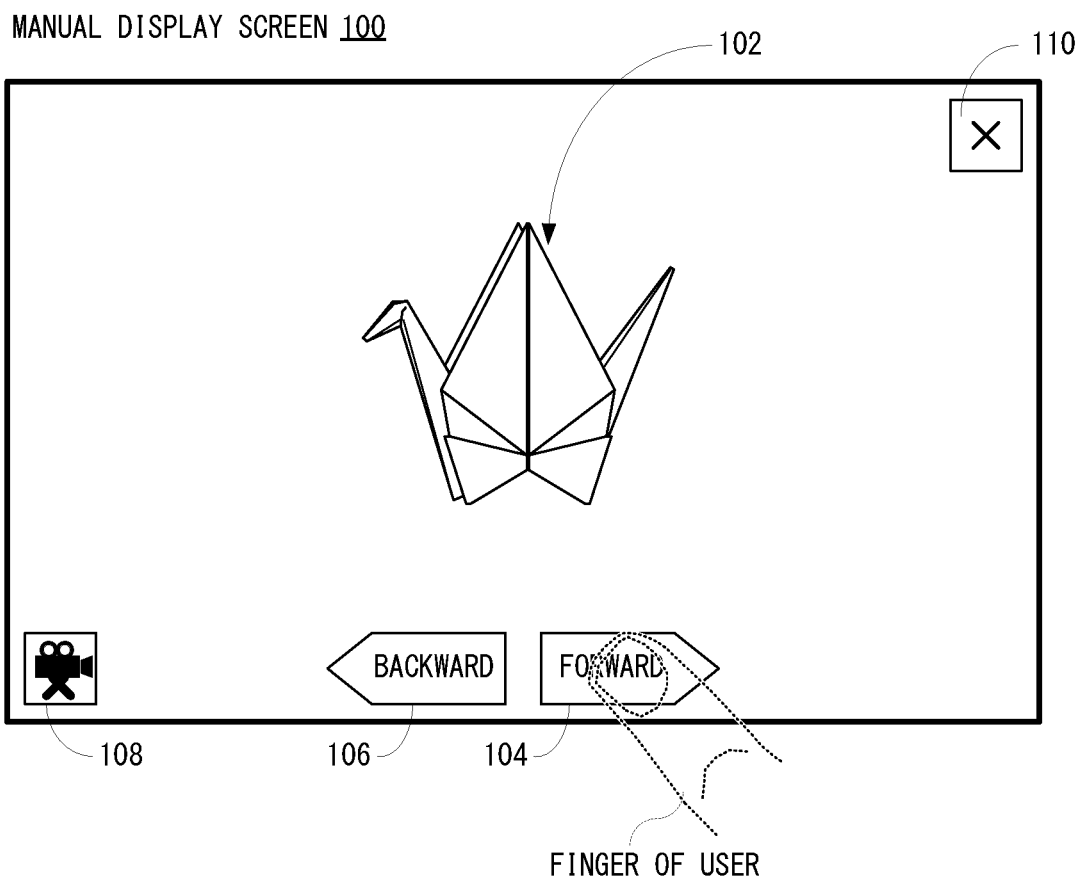
FIG. 4 is an illustration view showing a non-limiting third example manual display screen to be displayed on the display of the information processing apparatus shown in FIG. 1.

When the icon 104 is touched on, that is, when an operation for reduction is performed, playing of the animation of the origami object 102 is started, and the animation of the origami object 102 is continuously played as shown in FIG. 2, FIG. 3 and FIG. 4 while the touch-on is continued. In addition, although changes of the origami object 102 between FIG. 2 and FIG. 3 and changes of the origami object 102 between FIG. 3 and FIG. 4 are omitted because it is difficult to express the animation on the drawings, actually, an action that the origami object 102 is rotated, folded, or unfolded or extended is expressed continuously.

If the user releases a finger, that is, if the icon 104 is touched off, the playing of the animation of the origami object 102 is paused in a position or state at the time that the touch-off is performed. That is, in response to the operation for playing is no longer performed, the playing of the animation of the origami object 102 is paused. Moreover, if the touch-on of the icon 104 is performed in a state where the animation is stopped, the animation can be played from the position or state when paused. This is also applied to a case where the animation is to be reversely played, as described later.

Figure 5:
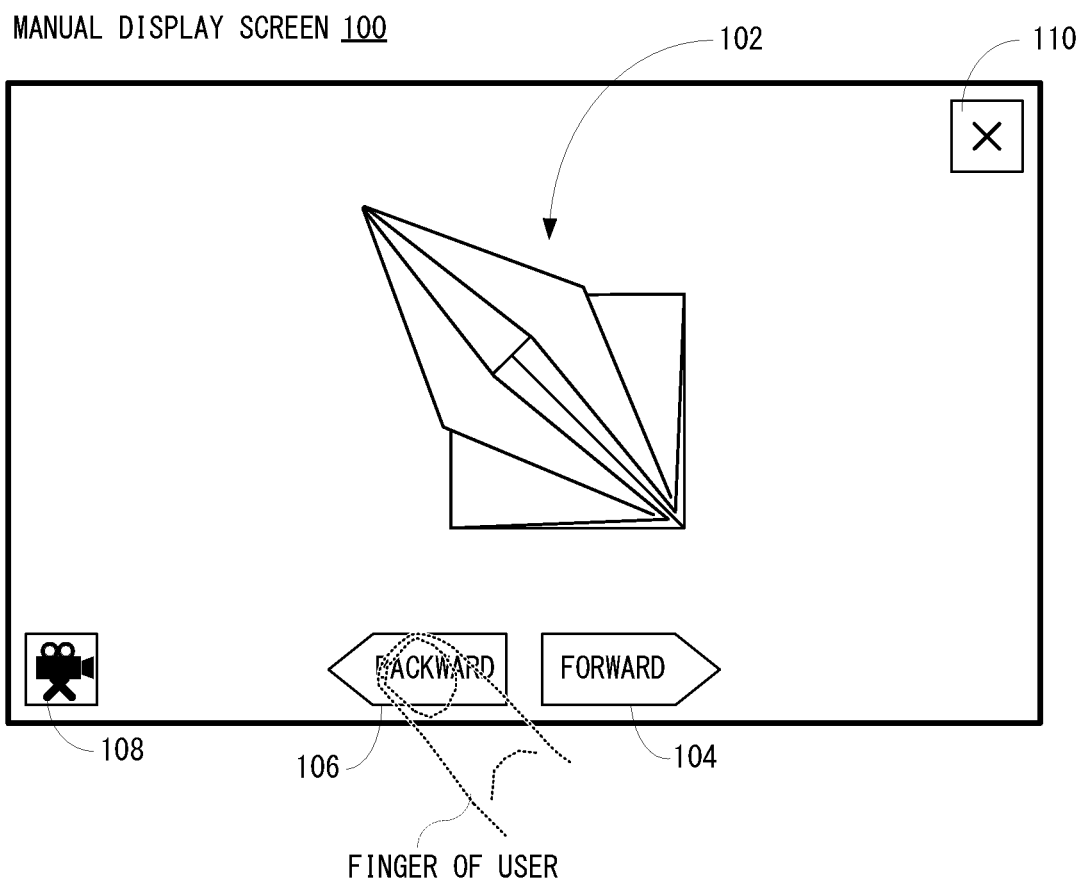
FIG. 5 is an illustration view showing a non-limiting fourth example manual display screen to be displayed on the display of the information processing apparatus shown in FIG. 1.
Figure 6:
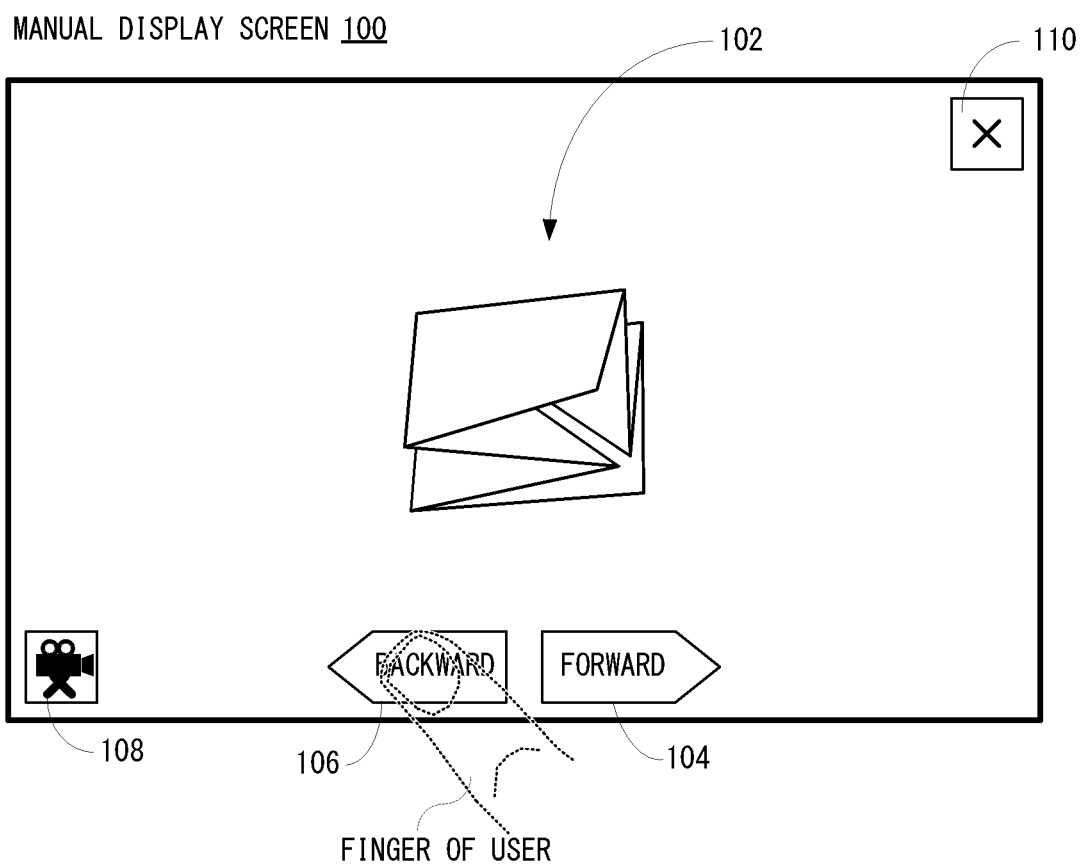
FIG. 6 is an illustration view showing a non-limiting fifth example manual display screen to be displayed on the display of the information processing apparatus shown in FIG. 1.

Moreover, if the icon 106 is touched on, reverse playing of the animation of the origami object 102 is started, and the animation of the origami object 102 is reversely played continuously as shown in FIG. 5 and FIG. 6 while the touch-on is continued. If the icon 106 is touched off by the user, the reverse playing of the animation of the origami object 102 is paused in a position or state at the time that the touch-off is performed. Therefore, if the touch-on of the icon 106 is performed in a state where the animation is stopped, the animation can be reversely played from the position or state when paused.

The information processing apparatus 10 is stored with data of the animation of the origami object 102 (hereinafter, referred to as "animation data"), which indicates from a folding start to completion when folding up to a completed shape, by referring to this animation data, the origami object 102 in the completed shape is drawn in the virtual space 200 (see FIG. 9). The animation consists of a plurality of frames (hereinafter, referred to as "animation frame") so that the origami object 102 may be gradually changed from an initial state. When the animation frame is 0 (zero), the origami object 102 is in its initial state and the origami object 102 of a square sheet shape is displayed. When the animation frame is the last frame, the origami object 102 is in its completed state, and the origami object 102 folded in the completed shape is displayed. That is, the animation or the manual display screen 100 of the origami object 102 is provided as a manual for a user to fold an origami in the completed shape.

Figure 7:
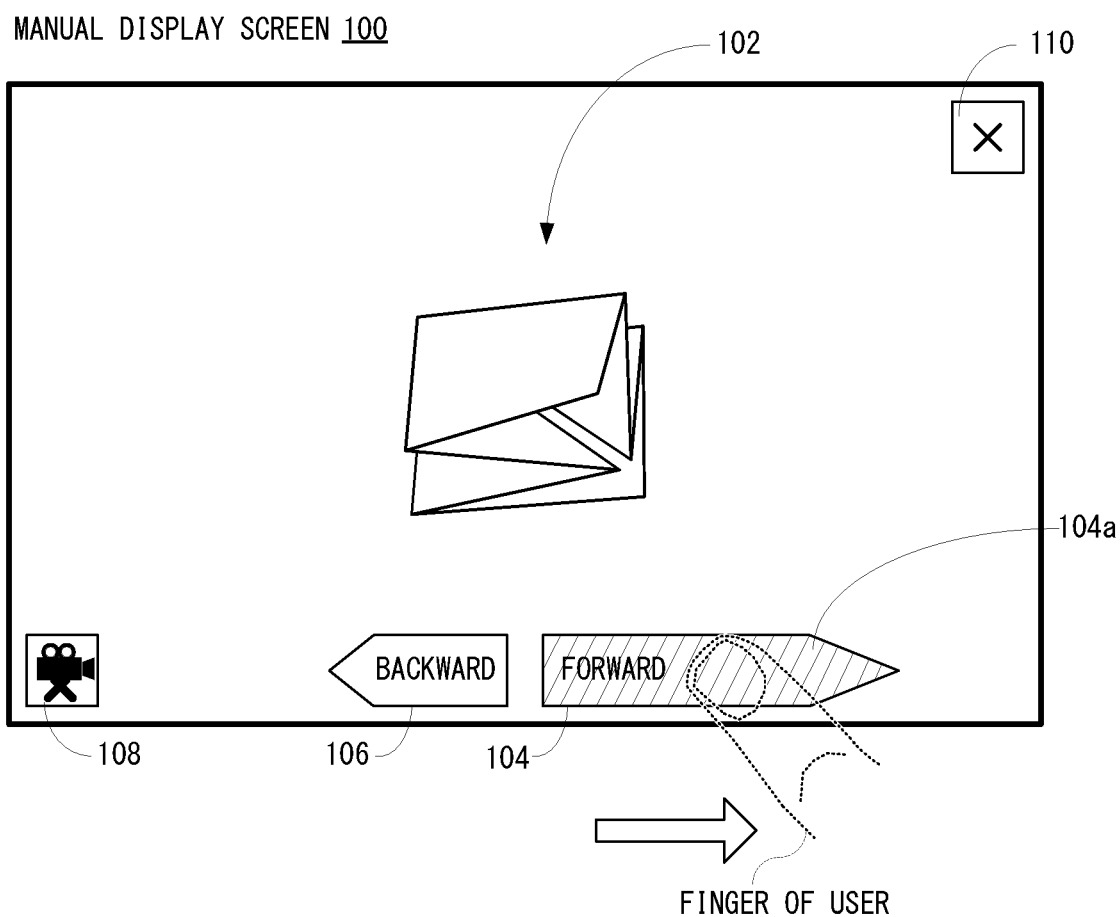
FIG. 7 is an illustration view showing a non-limiting sixth example manual display screen to be displayed on the display of the information processing apparatus shown in FIG. 1.

Moreover, the speed of playing or reversely playing the animation of the origami object 102 can be changed. In this embodiment, it is possible to increase the speed of playing or reversely playing the animation of the origami object 102, and it is also possible to decrease the speed having been once increased. If the user slides the icon 104 to the right in a state where the touch-on is performed as shown in FIG. 7, the speed of playing the animation is increased based on a magnitude of a slide from a touch position (hereinafter, referred to as "start point") when performing at a touch-on from a state of a touch-off.

Moreover, if the user slides the icon 104 to the left after the speed of playing the animation is increased, the magnitude of the slide from the start point is made small, and therefore, the speed of playing the animation is decreased.

Moreover, if the user performs a slide, a length of the icon 104 is changed based on the magnitude of the slide. In the example shown in FIG. 7, according to a slide rightward, the icon 104 is lengthened to the right. Moreover, a pattern of the background 104*a* of the icon 104 is displayed as an animation, like the animation of the origami object 102, a speed putting-forward the animation of the pattern of the background 104*a* can be increased based on the magnitude of the slide, and the speed having been once increased can also be decreased. At the time of speed change, the background 104*a* is displayed with a pattern (hereinafter, referred to as "change time pattern") different from a normal pattern.

The speed of playing the animation of the origami object 102 is changed by changing a reference speed (basic speed) based on the magnitude of the slide. In this embodiment, the reference speed is a speed that is set in advance by the developer etc., and may be set to a predetermined speed irrespective of the completed shape, or may be variably set based on the difficulty of completing the completed shape. Moreover, the reference speed of the speed of playing the animation of the origami object 102 is gradually increased based on the magnitude of the slide of a horizontal direction. In the display 36, an X axis is set horizontally and a Y axis is set vertically. Moreover, a vertex at left upper of a display surface or a display area of the display 36 is set as an origin, and a right direction is a plus direction of the X axis and a down direction is a plus direction of the Y axis.

A touch coordinate when the icon 104 is touched on is stored as a coordinate of the start point, and the magnitude of the slide is calculated from a difference at the time of subtracting an X coordinate of the start point from an X coordinate of a current touch position, and the speed of playing the animation of the origami object 102 is calculated based on this magnitude of the slide. That is, the reference speed is increased based on the magnitude of the slide. For example, the speed according to the magnitude of the slide is added to the reference speed, or a coefficient according to the magnitude of the slide is multiplied to the reference speed. However, the coefficient is a number larger than 1 (one). In this case, the speed and the coefficient according to the magnitude of the slide are linearly or stepwise increased based on the magnitude of the slide.

However, when increasing the speed of playing the animation, since the difference is calculated by subtracting the X coordinate of the start point from the X coordinate of the current touch position, the difference becomes a positive value. Therefore, when the difference is 0 (zero) or less, the speed of playing the animation is set to the reference speed.

In addition, although the speed of playing is calculated based on the magnitude of the slide that is calculated from the start point and the current touch position, it does not need to be limited to this. The speed of playing may be calculated based on the magnitude of the slide that is calculated from a reference point that is set in advance instead of the start point and the current touch position. For example, the reference point may be set between the icon 104 and the icon 106 or at a left end of the icon 104. That is, it is possible to calculate the speed of playing not only by a relative positional relationship between the start point and the current touch position but also by an absolute positional relationship between the reference point being set in advance and the current touch position. These are the same also about a case where a speed of reverse playing described later is to be calculated. However, in case of the reverse playing, it is possible to set another reference point between the icon 104 and the icon 106 or at a right end of the icon 106.

Moreover, as to the animation of the change time pattern of the background 104*a* of the icon 104, a speed can be calculated and changed with the same method as in the case of the animation of the origami object 102. However, the reference speed of playing the animation of the change time pattern of the background 104*a* may be a value that is the same as or different from the reference speed of playing the animation of the origami object 102.

Figure 8:
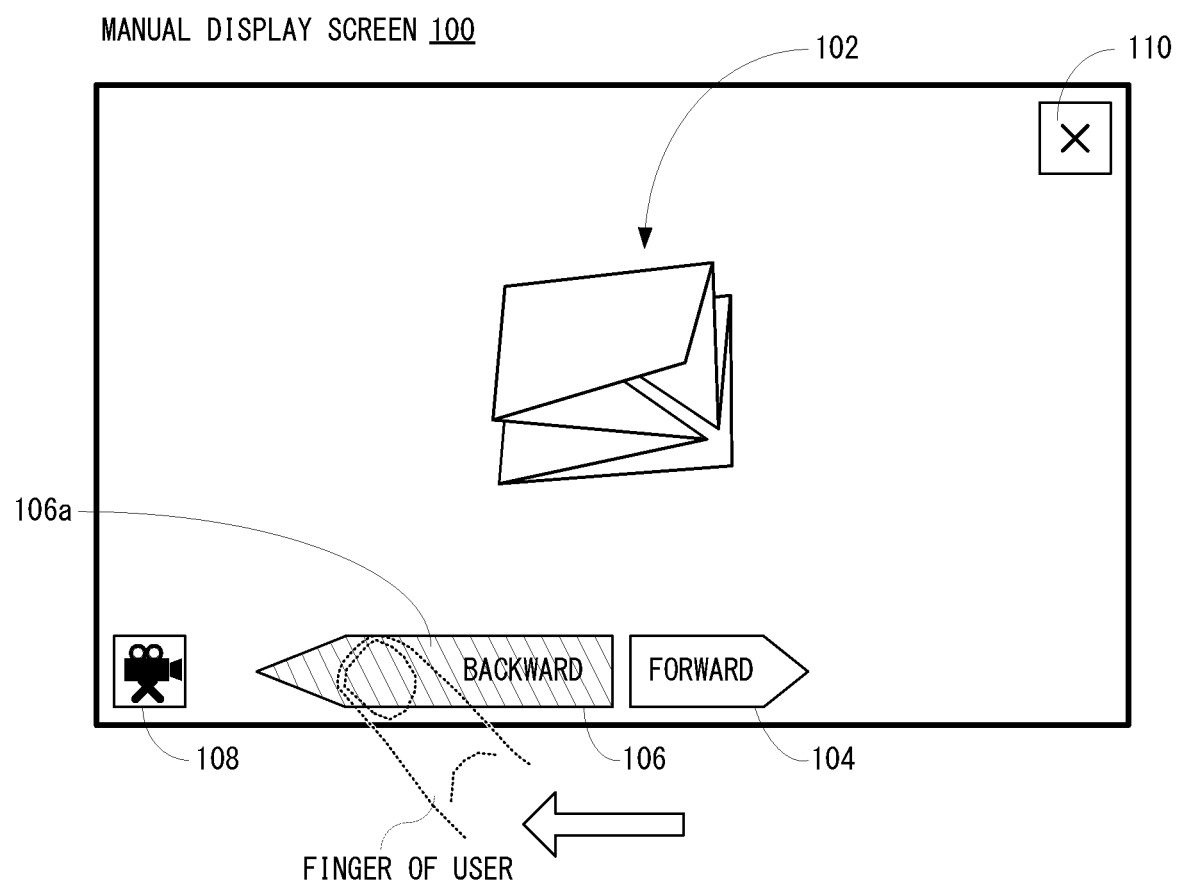
FIG. 8 is an illustration view showing a non-limiting seventh example manual display screen to be displayed on the display of the information processing apparatus shown in FIG. 1.

Moreover, if the user slides the icon 106 to the left in a state where a touch-on is performed, as shown in FIG. 8, the speed reversely playing the animation is increased based on the magnitude of the slide from the start point. Moreover, if the user slides the icon 106 to the right after the speed reversely playing the animation is increased, the magnitude of the slide from the start point is made small, and therefore, the speed reversely playing the animation is decreased.

Like the case shown in FIG. 7, if the user slides the icon 106, a length of the icon 106 is changed based on the magnitude of the slide. In the example shown in FIG. 8, the icon 106 is lengthened to the left according to a slide leftward. Moreover, a pattern of a background 106*a* of the icon 106 is displayed as an animation, like the animation of the origami object 102, a speed putting-forward the animation of a change time pattern of the background 106*a* can be increased based on the magnitude of the slide, and the speed having been once increased can also be decreased.

Like the case where the speed of playing the animation of the origami object 102 is calculated, if the user slides the icon 106 to the left in a state where a touch-on is performed, the speed reversely playing the animation is increased based on the magnitude of the slide from the start point. Moreover, if the user slides the icon 106 to the right after the speed reversely playing the animation is increased, the magnitude of the slide from the start point is made small, and therefore, the speed reversely playing the animation is decreased. In this case, the magnitude of the slide is calculated from a difference at the time of subtracting an X coordinate of the start point from an X coordinate of the current touch position. However, when increasing the speed reversely playing the animation, the difference becomes a negative value. Therefore, when the difference is 0 (zero) or more, the speed reversely playing the animation is set to the reference speed.

In addition, as to a speed for putting-forward the animation of the change time pattern of the background 106*a* of the icon 106, the speed can be calculated and changed with the same method as in the case of the reverse playing of the animation of the origami object 102.

In a case where the animation of the origami object 102 is played with the reference speed when displaying the manual display screen 100, if a unit time (frame) (hereinafter, referred to as "drawing frame") for updating the screen advances by one frame, an animation frame of the origami object 102 is moved to a frame one frame after a current frame. This is also applied to a case of putting-forward the animation frame of the change time pattern of the background 104*a* or the animation frame of the change time pattern of the background 106*a*. Moreover, in a case where the animation of the origami object 102 is reversely played with the reference speed, if the drawing frame advances by one frame, the animation frame of the origami object 102 is moved to a frame one frame before the current frame.

Moreover, in a case where the speed of playing the animation of the origami object 102 is made to be increased when displaying the manual display screen 100, an amount of putting-forward the animation frame is made large by the increased speed. For example, if the speed is changed to 1.5 times, the animation frame is put-forward 1.5 frames while the drawing frame is put-forward by one frame.

Since in the animation frame, a position of each polygon and angles of a plane that is formed with one or more polygons are set for each frame, it is possible to calculate positions etc. of each polygon between two frames through interpolation (in this embodiment, linear interpolation) of the positions etc. of each polygon between the two frames.

Therefore, the speed of playing or reversely playing the animation of the origami object 102 can be determined linearly. However, the speed of playing or reversely playing the animation of the origami object 102 can be determined stepwise.

In addition, although detailed description is omitted, if the animation of the origami object 102 is played or reversely played by touching the icon 104 or the icon 106, its state is continued until the touch-off is performed. Therefore, when the touch-on is detected continuously, even if a touch position protrudes the display area of the icon 104 or the icon 106, the playing or reverse playing of the animation is continued.

Moreover, if the user performs a touch-off and the playing or reverse playing of the animation of the origami object 102 is stopped, as described above, the icon 104 or the icon 106 returns to its original state. Specifically, the icon 104 or the icon 106 is returned to an original size and shape. That is, the icon 104 or the icon 106 being lengthened is shortened. Moreover, the background 104*a* or the background 106*a* is displayed with the normal pattern. Therefore, when the user resumes the playing or reverse playing, the animation of the origami object 102 is played or reversely played with the reference speed.

In addition, in this embodiment, when the user performs a touch-off, the icon 104 or the icon 106 is returned to the original state, but it does not need to be limited to this. For example, the icon 104 or the icon 106 may be shortened by half the length that is lengthened. In such a case, when the user resumes the playing or reverse playing, the animation of the origami object 102 is played or reversely played with a speed between the reference speed and the speed at the last time.

Thus, the animation of the origami object 102 can be played or reversely played by performing a touch-on to the icon 104 or the icon 106, and further, if performing the slide while being touched on, it is possible to increase the speed of playing or reversely playing the animation, and if performing a touch-off, the playing or reverse playing of the animation can be paused, and accordingly, an operation is simple.

Moreover, when increasing the speed of playing or reversely playing the animation of the origami object 102, the icon 104 or the icon 106 is lengthened (enlarged) and the change time pattern of the background 104*a* or the background 106*a* is displayed as an animation, and therefore, it is possible to easily know that the speed of playing or reversely playing the animation of the origami object 102 is increased and it is possible to intuitively know that the speed by the length of the icon 104 or the icon 106.

Moreover, when the animation of the origami object 102 is stopped, it is possible to watch the origami object 102 from another viewpoint or to enlarge or reduce (change magnification) by an operation of the user. However, a size capable of enlarging or reducing the origami object 102 is restricted.

Figure 9:
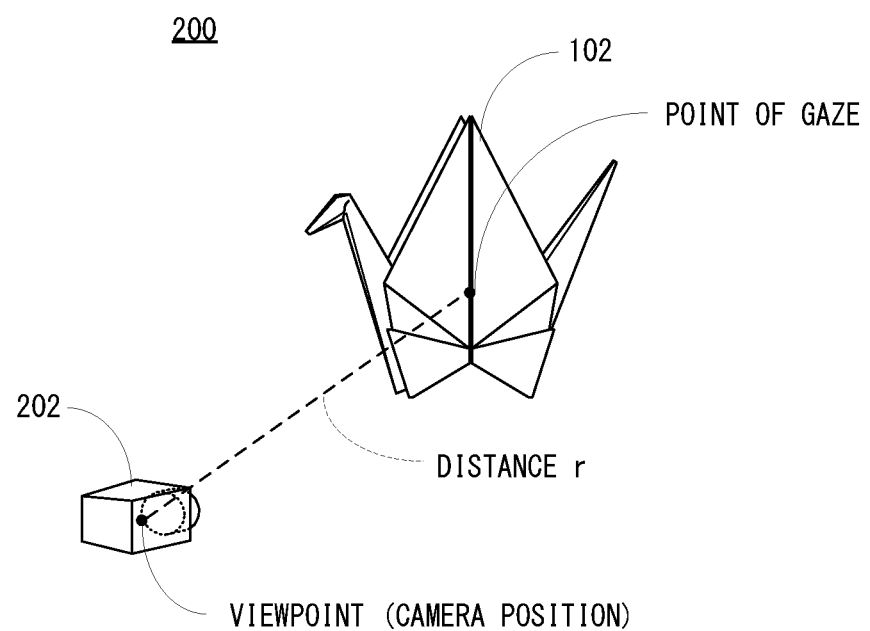
FIG. 9 is an illustration view showing a non-limiting example virtual space of this embodiment.

FIG. 9 is an illustration view showing a non-limiting example virtual space 200 of this embodiment. As shown in FIG. 9, the origami object 102 is located in a predetermined position of the virtual space 200, and a virtual camera 202 is located at a reference position or a position set or changed by the user so as to image the origami object 102. The position of the virtual camera 202 is a viewpoint, and a predetermined position of the origami object 102 is set as a gazing point. For example, the gazing point is set to the center or center of gravity in a current shape of the origami object 102. A distance r between the viewpoint and the gazing point may be changed by changing a magnification of the virtual camera 202 as described later.

Figure 10:
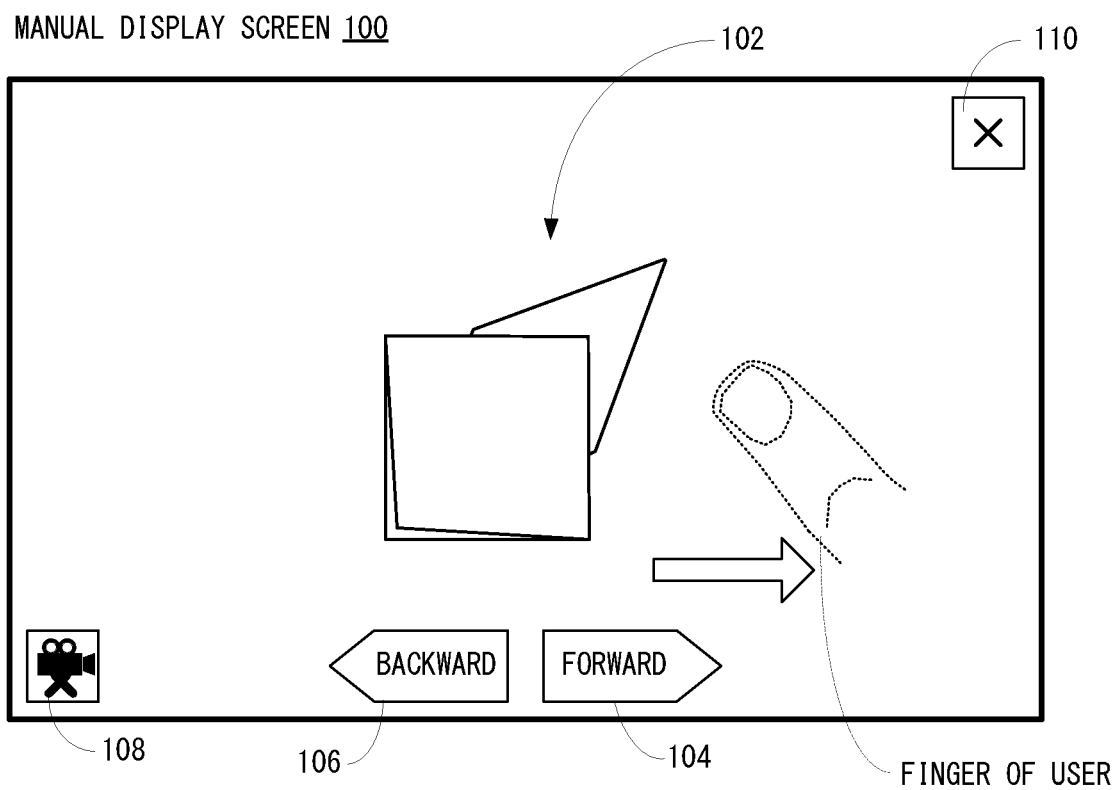
FIG. 10 is an illustration view showing a non-limiting eighth example manual display screen to be displayed on the display of the information processing apparatus shown in FIG. 1.
Figure 11:
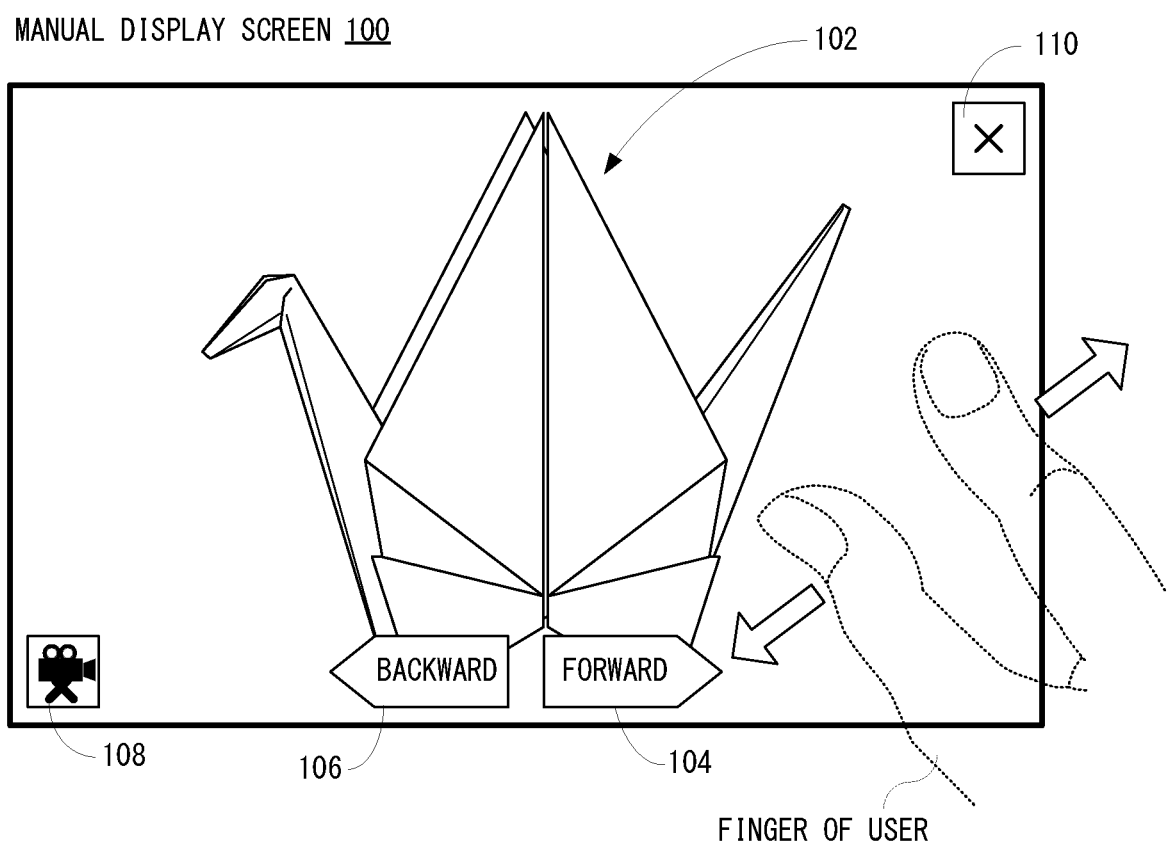
FIG. 11 is an illustration view showing a non-limiting ninth example manual display screen to be displayed on the display of the information processing apparatus shown in FIG. 1.

As shown in FIG. 10, if the user performs a slide in an area where the icons 104-110 are not displayed, the virtual camera 202 is moved, whereby the user can watch the origami object 102 from another viewpoint. In this embodiment, the viewpoint is a position of the virtual camera 202 in the virtual space. The virtual camera 202 views a predetermined gazing point, and is moved within the virtual space 200 in a state where the distance r between the viewpoint and the gazing point is kept constant. Therefore, if the user performs a slide in the area where the icons 104-110 are not displayed, the virtual camera 202 is moved along a surface of a sphere centered the gazing point and having a radius of the distance r. Since a manual image, i.e., the manual display screen 100 is an image that is imaged by the virtual camera 202, it seems to the user of the information processing apparatus 10 as if the origami object 102 is rotating according to the slide.

Moreover, if the user performs a pinch-out in the area where the icons 104-110 are not displayed, the magnification of the virtual camera 202 is increased. That is, the virtual camera 202 is made to be zoomed in. For example, the virtual camera 202 is moved in a direction approaching the gazing point. Therefore, the origami object 102 is enlarged in the manual display screen 100. Moreover, if a pinch-in is performed by the user in the area where the icons 104-110 are not displayed, the magnification of the virtual camera 202 is decreased. That is, the virtual camera 202 is made to be zoomed out. For example, the virtual camera 202 is moved in a direction away from the gazing point. Therefore, the origami object 102 is reduced in the manual display screen 100.

However, the largest value and smallest value of the magnification are set in advance, and therefore, the size of the origami object 102 when enlarged/reduced is restricted.

Moreover, although in this embodiment, when the magnification is to be changed, the virtual camera 202 is moved so as to change a distance from the gazing point, a focal length of the virtual camera 202 may be changed.

Figure 12:
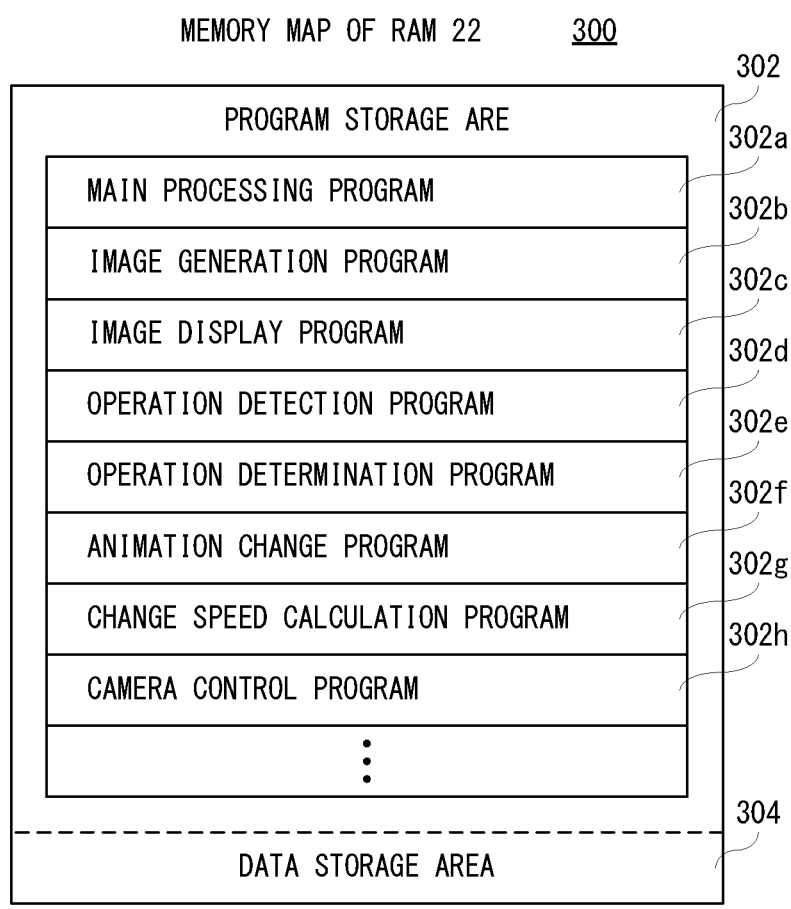
FIG. 12 is an illustration view showing a non-limiting example memory map of a RAM incorporated in the information processing apparatus shown in FIG. 1.

FIG. 12 is an illustration view showing a non-limiting example memory map 300 of the RAM 22 of the information processing apparatus 10 shown in FIG. 1. As shown in FIG. 12, the RAM 22 includes a program storage area 302 and a data storage area 304. The program storage area 302 is stored with an information processing program such as a manual display application program of the origami of this embodiment, and the information processing program includes a main processing program 302a, an image generation program 302b, an image display program 302c, an operation detection program 302d, an operation determination program 302e, an animation change program 302f, a change speed calculation program 302g, a camera control program 302h, etc.

In addition, the information processing program may be stored in advance in the flash memory 24, or may be acquired from an external information processing apparatus through a network such as an internet. Moreover, the information processing program may be obtained from an external memory such as an optical disk, a USB memory that are attachable to or detachable from the information processing apparatus 10. However, a part of the information processing program may be stored in the flash memory 24, and another part may be acquired from an external information processing apparatus or an external memory. These can be applied to image generation data 304b, animation data 304c, camera reference data 304d and operation area data 304e, to be described later.

The main processing program 302a is a program for processing a main routine of the application for a manual display of the origami of this embodiment. The image generation program 302b is a program for generating data of a manual image (hereinafter, referred to as "manual image data") using the image generation data 304b. The image display program 302c is a program for outputting the manual image data generated according to the image generation program 302b to the display 36. Therefore, a manual image corresponding to the manual image data is displayed on the display 36.

The operation detection program 302d is a program for detecting an operation by the user. In this embodiment, an operation of the touch panel or/and the operating button is detected. The operation determination program 302e is a program for determining an instruction by a touch operation. In this embodiment, the operation determination program 302e determines whether any one of the icons 104-110 is touched or an area excluding the icons 104-110 is touched while determining the kind of the touch operation, and determines whether the operation is an operation for playing, reversely playing or stopping the animation, or an operation for changing the speed of playing or reversely playing the animation, or an operation for rotating, enlarging or reducing the origami object 102. However, the kind of the touch operation may be a touch-on, a touch-off, a slide, a pinch-in and a pinch-out. Moreover, the operation for rotating, enlarging or reducing the origami object 102 is an operation to control the virtual camera 202.

The animation change program 302f is a program for playing or reversely playing the animation of the origami object 102 at a speed being set. Moreover, the animation change program 302f is also a program for putting-forward the animation of the change time pattern of the background 104a of the icon 104 or the animation of the change time pattern of the background 106a of the icon 106.

The change speed calculation program 302g calculates the speed of playing or reversely playing the animation of the origami object 102. In this embodiment, the calculated speed is also a speed for putting-forward the animation of the change time pattern of the background 104a of the icon 104 or the animation of the change time pattern of the background 106a of the icon 106.

The camera control program 302h is a program for moving the position of the virtual camera 202 when a touch operation of the user is performed within an area excluding the icons 104-110 and when the kind of the touch operation is a slide, pinch-in, or pinch-out. Moreover, the camera control program 302h is also a program for setting the virtual camera 202 at the reference position and the reference magnification when the user performs a touch-on to the icon 108.

Although illustration is omitted, the program storage area 302 is also stored with other programs, such as a communication program for performing communication with other information processing apparatuses 10, a sound output program for generating and outputting a sound required in the manual display processing, etc.

Figure 13:
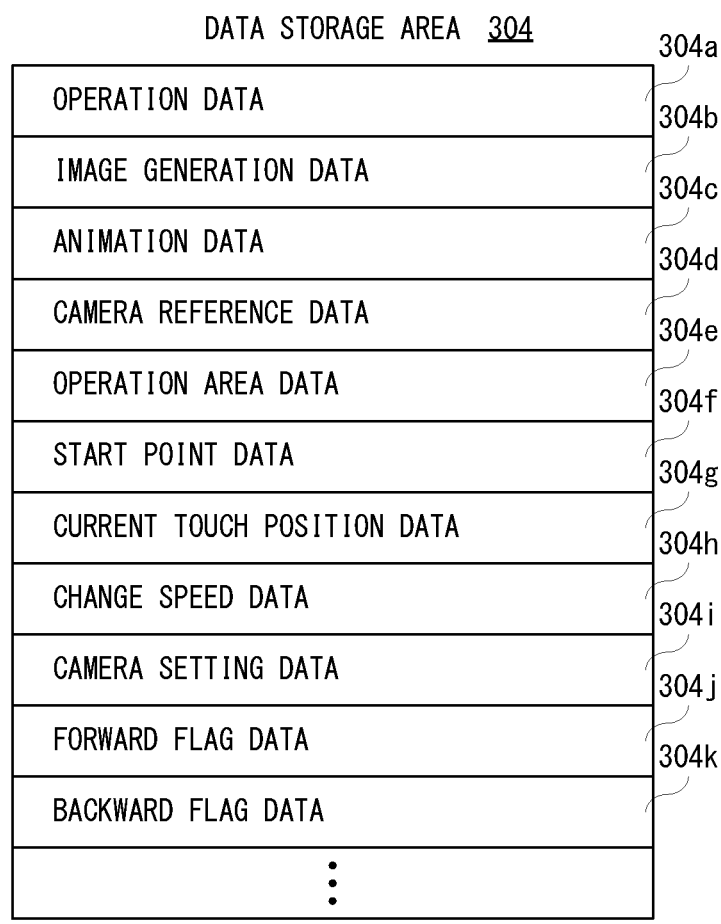
FIG. 13 is an illustration view showing non-limiting example specific contents of a data storage area shown in FIG. 12.

As shown in FIG. 13, the data storage area 304 is stored with the operation data 304a, the image generation data 304b, animation data 304c, camera reference data 304d, operation area data 304e, start point data 304f, current touch position data 304g, change speed data 304h, camera setting data 304i, forward flag data 304j, backward flag data 304k, etc.

The operation data 304a is operation data that is input from the input device 30, and is stored according to a time series. The operation data 304a is erased if used for processing of the processor 20.

The image generation data 304b includes data of polygon data and texture data for generating the manual image data, etc. The animation data 304c is data for putting-forward the animation of the origami object 102, the animation of the change time pattern of the background 104a of the icon 104 and the animation of the change time pattern of the background 106a of the icon 106. The animation data of the origami object 102 includes coordinates of the vertices of a plurality of parts (a plane composed of one or more polygons, in this embodiment) constituting the origami object 102 for each animation frame, and changes in movements of respective parts and changes in rotation angles at portions that the respective parts are coupled with other parts, stored according to a time series. The animation data of the animation of the animation of the change time pattern of the background 104a of the icon 104 and the animation of the change time pattern of the background 106a of the icon 106 also includes data that the three-dimensional coordinate data of the respective vertices of the respective polygons constituting the animation of the change time pattern of the background 104a of the icon 104 or the animation of the change time pattern of the background 106a of the icon 106 are determined for each animation frame.

The camera reference data 304d is data about the reference position and the reference magnification of the virtual camera 202. In this embodiment, the reference position and the reference magnification are set to appropriate values for each animation frame of the animation of the origami object 102 in each completed shape. However, the reference position and the reference magnification may be fixed at predetermined values in each completed shape, without changing for every animation frame.

The operation area data 304e is data indicating respective operation areas of the icons 104-110 to be displayed on the manual display screen 100. In this embodiment, a plurality of coordinates data included in the operation area that is set corresponding to each of the icons 104-110 are stored. However, since the icon 108 and the icon 110 are quadrangular, when setting the operation area to the same quadrangle, coordinates of two points which are diagonal may be set as the operation area. This is also applied to a case where the operation areas of the icon 104 and the icon 106 are approximated by a rectangle.

The start point data 304f is coordinate data about a touch position at the time it is determined that a touch-on is performed to the icon 104 or the icon 106, and is erased when a touch-off is performed. The current touch position data 304g is coordinate data about a touch position in the current drawing frame, and is updated at every time a touch position is detected.

The change speed data 304h is data about the speed of playing or reversely playing the animation. The camera setting data 304i is data about the reference position and the reference magnification of the virtual camera 202 that are set in accordance with the camera reference data 304d or data about the position and the magnification of the virtual camera 202 that are set in accordance with the instructions of the user, and is set to the reference position and the reference magnification when the icon 108 is touched. However, the data that is set according to the instructions by the user is not limited to both the position and the magnification of the virtual camera 202, and only one of them may be set.

The forward flag data 304j is data about a flag for determining whether the icon 104 is touched on (hereinafter, referred to as "forward flag"), and the forward flag is turned on when it is determined that the icon 104 is touched on from a state of a touch-off, and the forward flag is turned off when a touch-off is determined.

The backward flag data 304k is data about a flag for determining whether the icon 106 is touched on (hereinafter, referred to as "backward flag"), and the backward flag is turned on when it is determined that the icon 106 is touched on from a state of a touch-off, and the backward flag is turned off when a touch-off is determined.

Although illustration is omitted, the data storage area 304 is further stored with data required for the information processing such as manual display processing, and is provided with a counter(s) or timer(s).

FIG. 14-FIG. 18 are flowcharts of non-limiting example manual display processing of the processor 20 shown in FIG. 1. For example, when a completed shape of an origami that a manual is to be displayed is selected in a menu screen, the manual, i.e., animation data 304c for folding the origami in the completed shape is selected, and an initial screen of this selected manual is displayed, and then, the manual display processing for displaying the manual display screen 100 after the initial screen will be started.

First, the processor 20 performs initial processing in a step S1. Here, the camera reference data 304d is stored as the camera setting data 304i in the data storage area 304, the operation area data 304e about the operation areas corresponding to the display areas of the icons 104-110 are stored in the data storage area 304, and the forward flag data 304j and the backward flag data 304k indicating that the forward flag and the backward flag are turned off, respectively are stored in the data storage area 304.

In a next step S3, the operation data that is input from the input device 30 is acquired. At this time, the processor 20 stores the acquired operation data 304a in the data storage area 304 according to a time series.

In a subsequent step S5, it is determined whether there is any touch operation. That is, the processor 20 determines whether the input from the touch panel is acquired (detected) in the step S3. If "NO" is determined in the step S5, that is, if there is no touch operation, the forward flag and the backward flag are turned off in a step S7, and the animation is paused at a current animation frame in a step S9, and the process proceeds to a step S61 shown in FIG. 18.

In addition, in a case of "NO" in the step S5, if the playing or reverse playing of the animation is not performed, i.e., that the playing or reverse playing of the animation is stopped or paused, the process proceeds to a step S57, without performing the step S7 and the step S9.

Moreover, in a case of "NO" in the step S5 because a touch-off is performed, the images of the icon 104 and the icon 106 are also returned the original images of them.

On the other hand, if "YES" is determined in the step S5, that is, if there is a touch operation, it is determined in a step S11 whether the forward flag is turned on with reference to the forward flag data 304j. That is, the processor 20 determines here whether the animation is played. Moreover, when there is a touch operation, the processor 20 copies corresponding touch coordinate data from the operation data 304a to store as the current touch position data 304g.

Figure 16:
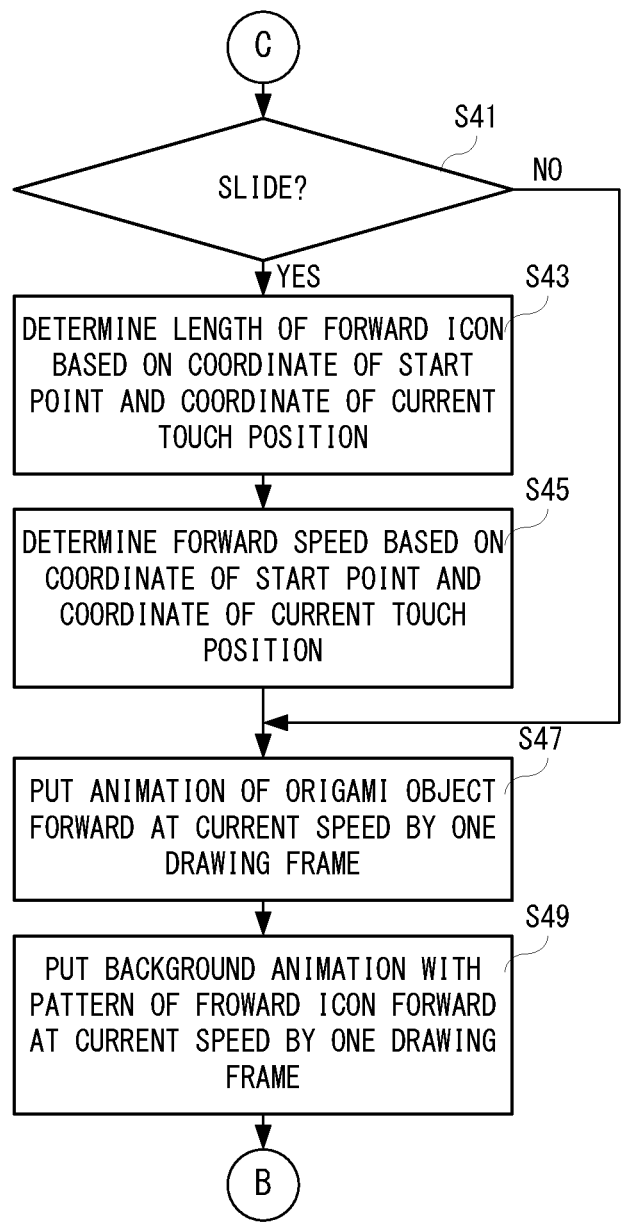
FIG. 16 is a flow chart showing a third part of the manual display processing of the processor incorporated in the information processing apparatus shown in FIG. 1, following FIG. 14.

If "YES" is determined in the step S11, that is, if the forward flag is turned on, the process proceeds to a step S41 shown in FIG. 16. On the other hand, if "NO" is determined in the step S11, that is, if the forward flag is turned off, it is determined in a step S13 whether the backward flag is turned on with reference to the backward flag data 304k. That is, the processor 20 determines here whether the animation is reversely played.

Figure 17:
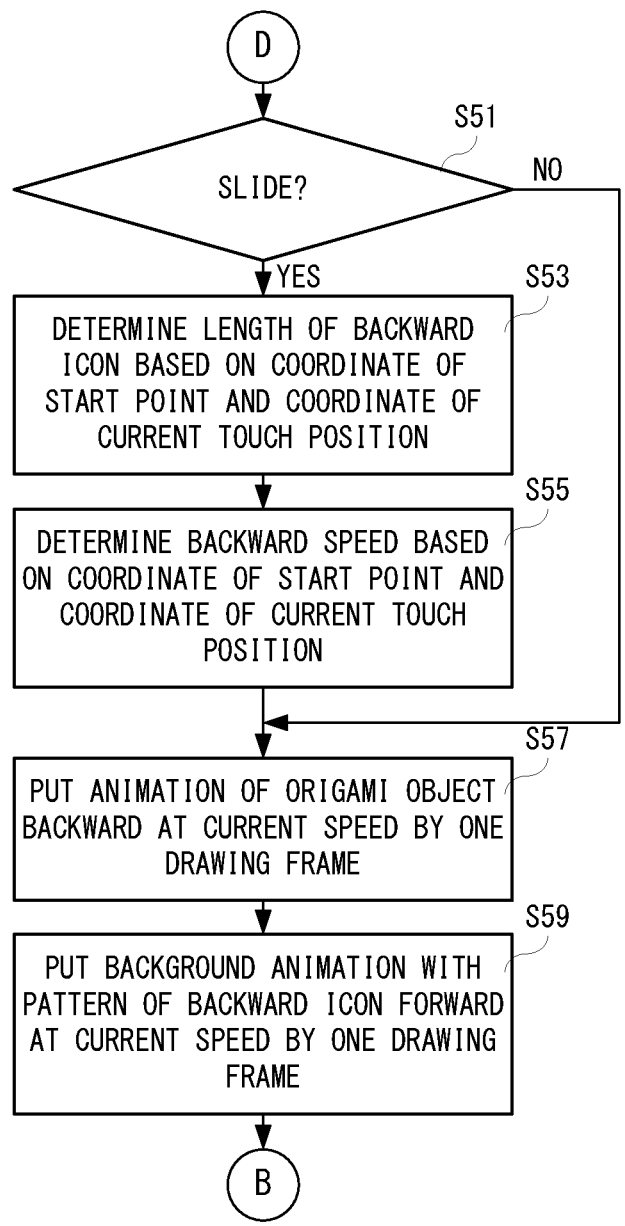
FIG. 17 is a flow chart showing a fourth part of the manual display processing of the processor incorporated in the information processing apparatus shown in FIG. 1, following FIG. 14.

If "YES" is determined in the step S13, that is, if the backward flag is turned on, the process proceeds to a step S51 shown in FIG. 17. On the other hand, if "NO" is determined in the step S13, that is, if the backward flag is turned off, it is determined in a step S15 whether the icon 104 is turned on. Here, the processor 20 determines whether the touch coordinate corresponding to the touch operation that is detected in the step S3 is included in the display area of the icon 104. Hereinafter, the same is applied to a case of determining whether each of the icons 106, 108 and 110 is turned on.

If "YES" is determined in the step S15, that is, if the icon 104 is turned on, the forward flag is turned on in a step S17, and the current touch coordinate is stored as the coordinate of the start point in a step S19. That is, the current touch position data 304g is stored as the start point data 304f in the data storage area 304.

In a next step S21, the animation is put-forward by 1 (one) drawing frame with the reference speed, and the process proceeds to the step S61. Here, in 1 (one) drawing frame, the animation is put-forward 1 (one) animation frame. The same is applied to a step S29 described later.

Figure 15:
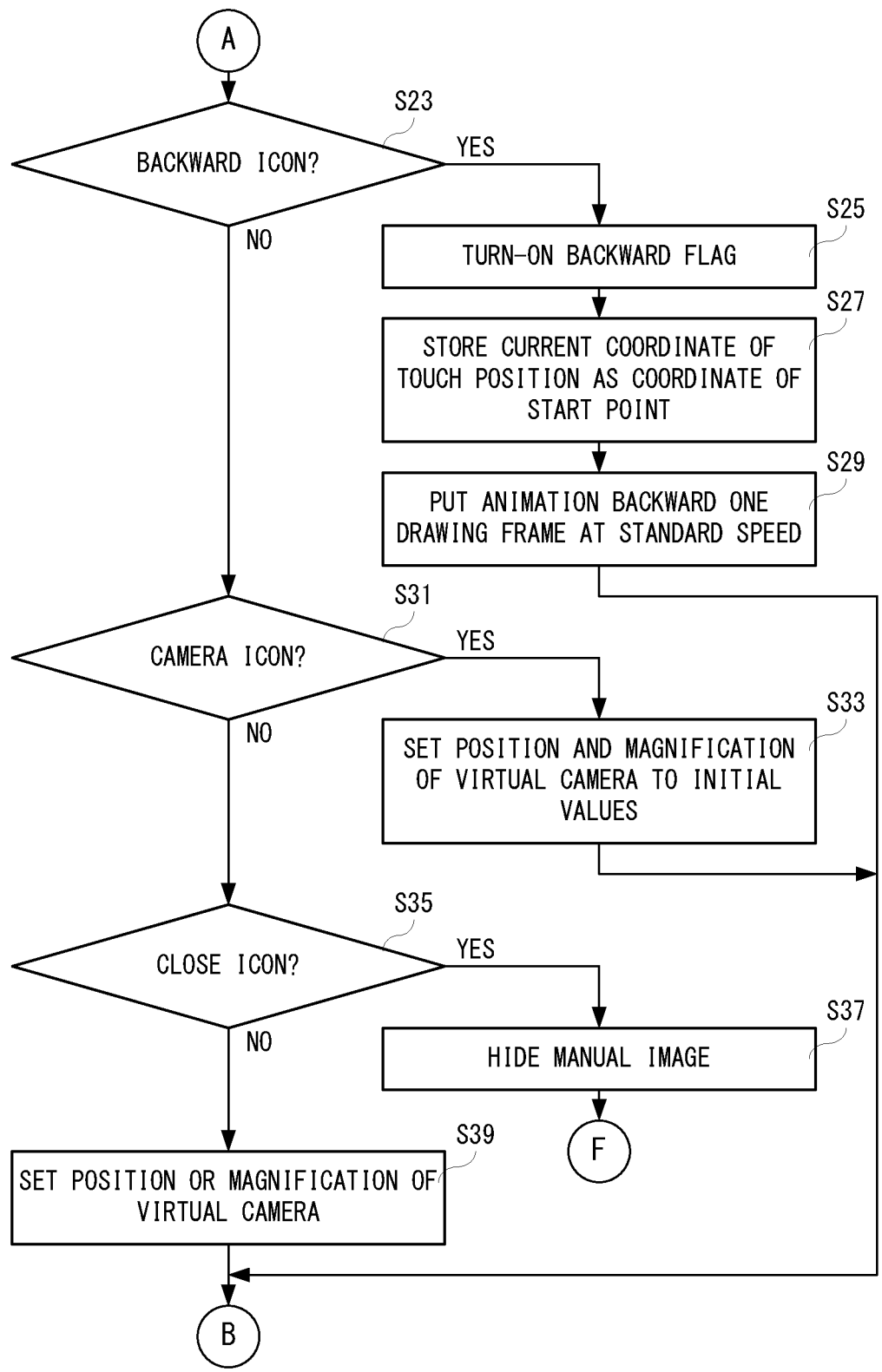
FIG. 15 is a flow chart showing a second part of the manual display processing of the processor incorporated in the information processing apparatus shown in FIG. 1, following FIG. 14.

Moreover, if "NO" is determined in the step S15, that is, if the icon 104 is not turned on, it is determined in a step S23 shown in FIG. 15 whether the icon 106 is turned on. If "YES" is determined in the step S23, that is, if the icon 106 is turned on, the backward flag is turned on in a step S25, and the current touch coordinate is stored as the coordinate of the start point in a step S27. Then, in a step S29, the animation is put-backward by 1 (one) drawing frame with the reference speed, and the process proceeds to the step S61.

On the other hand, if "NO" is determined in the step S23, that is, if the icon 106 is not turned on, it is determined in a step S31 whether the camera icon 108 is turned on. If "YES" is determined in the step S31, that is, if the camera icon 108 is turned on, in a step S33, the position and the magnification of the virtual camera 202 are set to the reference position and the reference magnification that are initial values, and the process proceeds to the step S61. That is, in the step S33, the processor 20 stores the camera reference data 304d as the camera setting data 304i in the data storage area 304.

Figure 18:
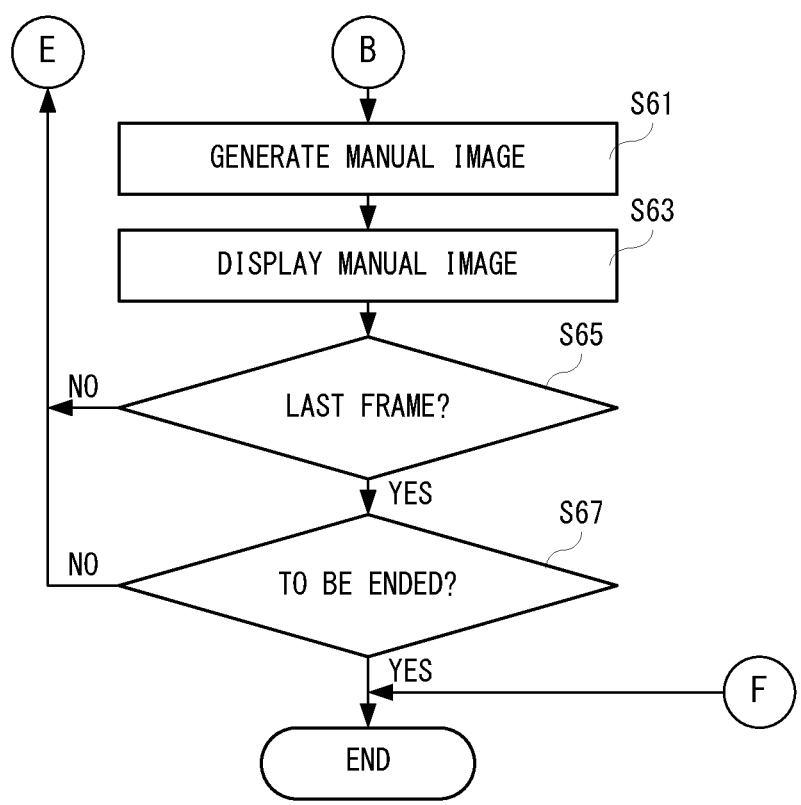
FIG. 18 is a flow chart showing a fifth part of the manual display processing of the processor incorporated in the information processing apparatus shown in FIG. 1, following FIG. 14.

On the other hand, if "NO" is determined in the step S31, that is, if the camera icon 108 is not turned on, it is determined in a step S35 whether the icon 110 is turned on. If "YES" is determined in the step S35, that is, if the icon 110 is turned on, non-display of the manual image is performed in a step S37, and the manual display processing is ended as shown in FIG. 18. That is, in the step S37, the manual display screen 100 is closed, and the manual display processing is forcedly ended, and then, a menu screen is displayed on the display 36, for example.

On the other hand, if "NO" is determined in the step S35, that is, if the icon 110 is not turned on, in a step S39, the position or the magnification of the virtual camera 202 is set, and then, the process proceeds to the step S61. In the step S39, in a case of a slide operation, according to the slide, the virtual camera 202 is moved along a surface of a sphere having a radius of a straight line connecting the gazing point and the virtual camera 202 in a state where the virtual camera 202 is being directed to the gazing point. Moreover, in a case of a pinch operation, according to a pinch-in or pinch-out, the magnification is made small or large.

As shown in FIG. 16, in the step S41, it is determined whether a slide is performed. That is, it is determined whether the touch coordinate is changed. If "NO" is determined in the step S41, that is, if not a slide but in only continuing the touch-on, the process proceeds to a step S47. On the other hand, if "YES" is determined in the step S41, that is, if a slide is performed, the length of the icon 104 is determined based on the coordinate of the start point and the current touch coordinate in a step S43, and the speed for putting-forward the animation is determined based on the coordinate of the start point and the current touch coordinate in a step S45. A method of determining the speed is as described above.

In the step S47, the animation of the origami object 102 is put-forward by 1 (one) drawing frame at the current speed. In a next step S49, the animation of the change time pattern of the background 104a of the icon 104 is put-forward by 1 (one) drawing frame at the current speed, and the process proceeds to the step S61. That is, in the step S47, the animation frame of the animation of the change time pattern of the background 104a is put-forward by the length multiplying the time corresponding to 1 (one) drawing frame to the current speed. For example, when the current speed is 1.5 times the reference speed, 1.5 animation frame is put-forward in 1 (one) drawing frame. Since the three-dimensional coordinates of the vertices of respective polygons for every 1 (one) animation frame are stored in this embodiment, the three-dimensional coordinates of the vertices of the respective polygons between two animation frames of a next animation frame and a next next animation frame are calculated using the three-dimensional coordinates of the vertices of the respective polygons of the two animation frames. This is also applied to a step S57 described later.

However, when the change time pattern of the background 104a is not being displayed by animation, the process proceeds to the step S51 without performing the processing of the step S49.

As shown in FIG. 17, in the step S51, it is determined whether a slide is performed. If "NO" is determined in the step S51, that is, if not a slide but in only continuing the touch-on, the process proceeds to the step S57. On the other hand, if "YES" is determined in the step S51, that is, if a slide is performed, the length of the icon 106 is determined based on the coordinate of the start point and the current touch coordinate in a step S53, and the speed for putting-backward the animation is determined based on the coordinate of the start point and the current touch coordinate in a step S55. In the step S57, the animation of the origami object 102 is put-backward by 1 (one) drawing frame at the current speed. In a next step S59, the animation of the change time pattern of the background 106a of the icon 106 is put-forward by 1 (one) drawing frame at the current speed, and the process proceeds to the step S61.

However, when the change time pattern of the background 106a is not being displayed by animation, the process proceeds to the step S61 without performing the processing of the step S59.

As shown in FIG. 18, in the step S61, a manual image is generated. In the step S61, the processor 20 locates the origami object 102 of the animation frame previously calculated in the predetermined position in the virtual space 200, and arranges the icons 104-110. Moreover, the virtual camera 202 that the position and the magnification are set according to the camera setting data 304i is arranged in the virtual space 200, and the image that is imaged by this virtual camera 202 is generated as the manual image.

In a next step S63, the manual image generated in the step S61 is displayed. That is, the manual display screen 100 as shown in FIG. 2-FIG. 8 and FIG. 10-FIG. 11 is displayed on the display 36. In a next step S65, it is determined whether the animation is in the last animation frame. That is, the processor 20 determines whether the manual is put-forward to the last.

Figure 14:
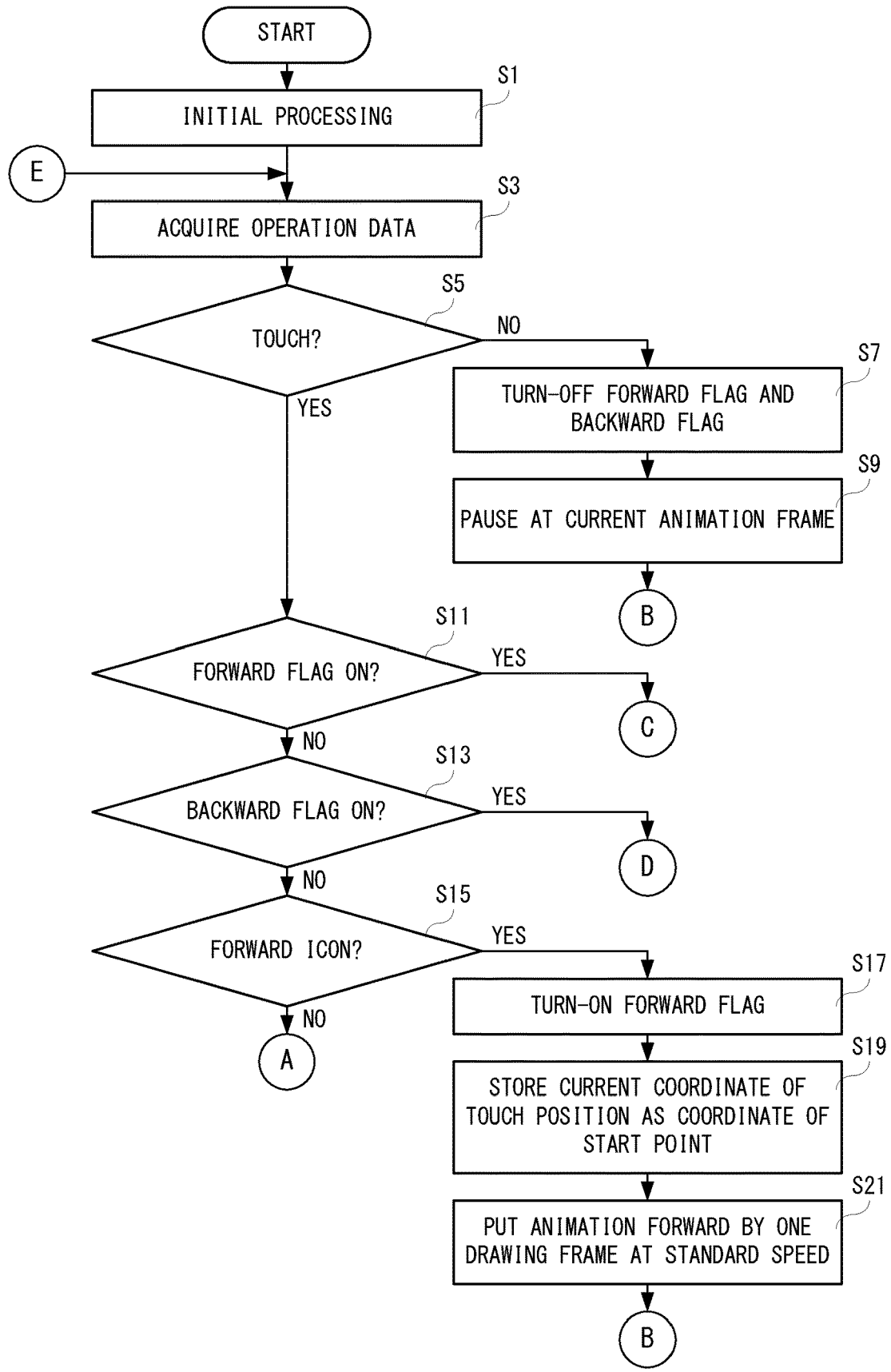
FIG. 14 is a flow chart showing a first part of non-limiting example manual display processing of a processor incorporated in the information processing apparatus shown in FIG. 1.

If "NO" is determined in the step S65, that is, if it is not the last animation frame of the animation, the process returns to the step S3 shown in FIG. 14. On the other hand, if "YES" is determined in the step S65, that is, if it is the last animation frame of the animation, it is determined in a step S67 whether it is to be ended. In this step S67, the processor 20 determines whether a predetermined time period (for example, several tens of seconds to several minutes) elapses after the animation is put-forward to the last animation frame, or an instruction of ending is input by the user.

If "NO" is determined in the step S67, that is, if it is to be ended, the process returns to the step S3. On the other hand, if "YES" is determined in the step S67, that is, if it is to be ended, the manual display processing is terminated.

In addition, although illustration is omitted, since it is impossible to return before a top animation frame, when returned to the top animation frame, the processing of the step S29 and the step S57 are skipped. However, when returned to the top animation frame, an operation to the icon 106 may be invalidated.

According to this embodiment, the animation of the origami in the manual display screen is played or reversely played if the forward icon or the backward icon is touched on, and the animation of the origami is stopped if the touch-off is performed, and therefore, it is possible to learn a folding method of the origami by the animation, and when actually folding the origami, the animation is stopped when the touch is released, and accordingly, it is possible to put-forward or put-backward or stop the manual with a simple operation. Moreover, since the speed of change of the animation is increased if performing a slide to lengthen the icon, it is also easily performed setting the speed. Therefore, according to this embodiment, it is possible to increase the operability of the user.

In addition, although the speed of playing or reversely playing the animation is made larger than the reference speed by performing the slide operation in this embodiment, the speed of playing or reversely playing the animation may be made smaller than the reference speed. Alternatively, the speed of playing or reversely playing the animation may be made larger or smaller than the reference speed based on the direction of the slide operation.

Figure 19:
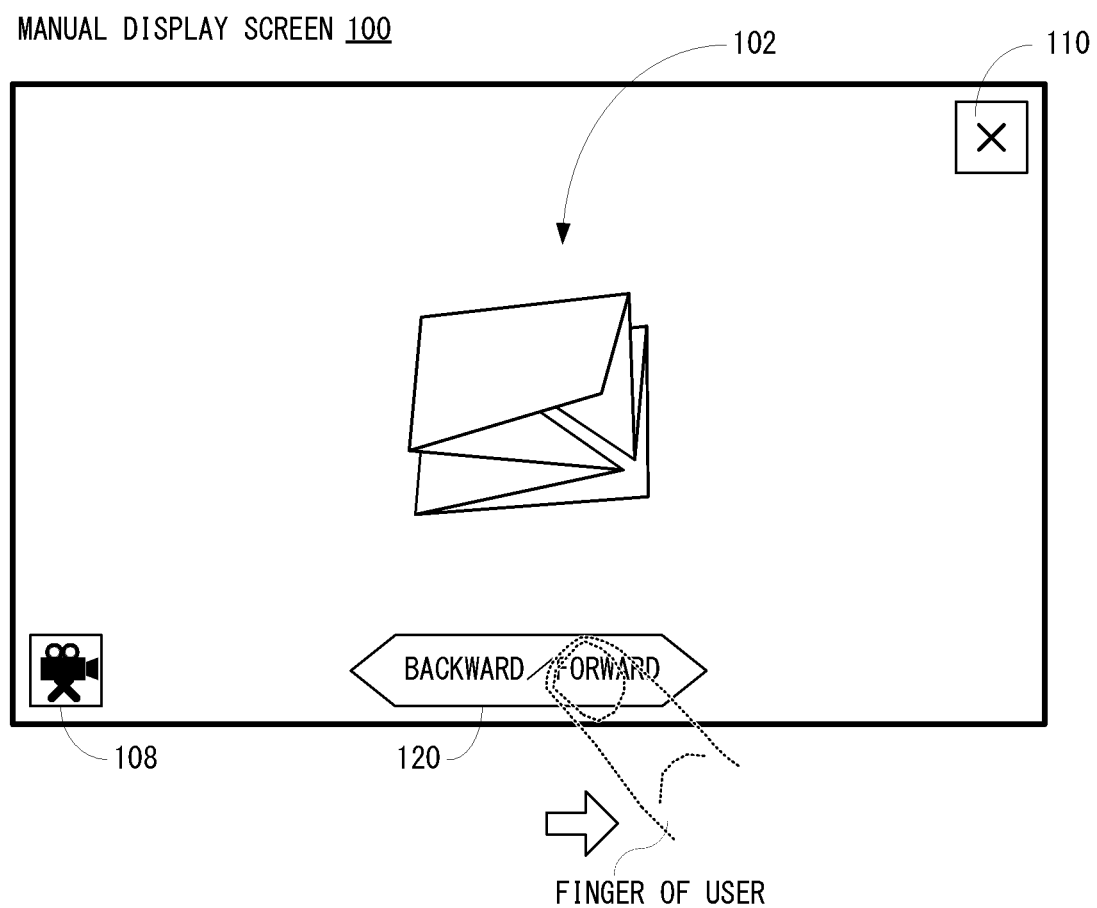
FIG. 19 is an illustration view showing a non-limiting tenth example manual display screen to be displayed on the display of the information processing apparatus shown in FIG. 1.

Moreover, in this embodiment, the animation of the origami object is made to be played or reversely played by providing the forward icon and the backward icon, and touching one of them, but it does not need to be limited to this. In another embodiment, as shown in FIG. 19, there is provided with a single icon 120 for playing or reversely playing the animation of the origami object 102, and base on an operation to the icon 120, the animation may be played or reversely played, and the speed may be also changed. In this embodiment, the icon 120 is an operation area for playing or reversely playing the animation of the origami object 102.

In such a case, for example, when the icon 120 is touched on and slid to the right, the animation is played at the time a magnitude the rightward slide exceeds a predetermined magnitude (for example, several to several dozen dots). Inversely, when the icon 120 is touched on and slid to the left, the animation is reversely played at the time a magnitude the leftward slide exceeds a predetermined magnitude (for example, several to several dozen dots). Furthermore, if the magnitude of the slide is increased, the icon 120 is lengthened in the slide direction, and thus, the speed of playing or reversely playing the animation is increased. FIG. 20 shows the manual display screen 100 in a case where by touching the icon 120 and then sliding toward the right, the animation of the origami object 102 is played at the speed that is determined by the magnitude of the slide. In such a case, the animation of the icon 120 is also put-forward at the speed that is determined by the magnitude of the slide so that the pattern of the background 120a of the icon 120 is moved. The same is applied to a case where the animation of the origami object 102 is reversely played.

Specifically, in the manual display processing shown in FIG. 14-FIG. 18, the following modification may be added.

When "YES" is determined in the step S15, it is determined whether the magnitude of the slide toward the right exceeds the predetermined magnitude, and if it is determined that the magnitude of the slide toward the right exceeds the predetermined magnitude, the process may proceed to the step S17. In this case, in the step S19, the coordinate of a touch position at the time of determining that the magnitude of the slide toward the right exceeds the predetermined magnitude is stored as the coordinate of the start point.

Moreover, when "YES" is determined in the step S23, it is determined whether the magnitude of the slide toward the left exceeds the predetermined magnitude, and if it is determined that the magnitude of the slide toward the left exceeds the predetermined magnitude, the process may proceed to the step S25. In this case, in the step S27, the coordinate of a touch position at the time of determining that the magnitude of the slide toward the left exceeds the predetermined magnitude is stored as the coordinate of the start point.

Furthermore, although the animation is played, reversely played or paused by drawing the origami object in this embodiment, it is possible to play, reversely play or pause a video.

Thus, when the video is to be played, reversely played or paused, a configuration capable of playing a plurality of videos that an object is imaged in the real space from a plurality of directions by a plurality of video cameras may be constructed, and it may be switched to the video that is imaged of the video camera from a corresponding viewpoint by switching a viewing position i.e., the viewpoint of the object according to an operation of the user.

Moreover, in this embodiment, the manual display screen is displayed as a manual for a user to fold an origami into a completed shape and the animation of the origami object included in the manual display screen is play, reversely played or paused, but it does not need to be limited to playing of animation, etc. As another example, if playing, reversely playing or pausing a video that a sports or a car race is recorded by the information processing apparatus of this embodiment, when the user wants to carefully watch a specific moment in a certain scene, it is possible to watch the specific moment with a simple operation.

In addition, although the information processing apparatus performs all manual display processing shown in FIG. 14-FIG. 18 in this embodiment, by performing a part or whole of the processing by an external computer capable of performing communication with the information processing apparatus, the information processing apparatus may acquire a processing result(s) of the part or whole from the computer. In such a case, an information processing system is constituted by the information processing apparatus and the computer communicably connected with this information processing apparatus.

Moreover, in this embodiment, a portable information processing apparatus is used, but needless to say, a stationary information processing apparatus such as a desktop PC can be used. Moreover, other portable terminals such as a notebook PC, PDA, tablet PC, etc. can be used.

Furthermore, although the icon is operated using the touch panel in this embodiment, other pointing devices such as a computer mouse may be used, and an operating button such as a cross button and a push button may be used. For example, when using a computer mouse or an operating button, a cursor image is displayed on the manual display screen, and the position on the surface of the display or a position in the display area can be designated with this cursor image.

Moreover, the display contents of the manual, structure of the information processing apparatus and the specific numerical values shown in this embodiment are mere examples, should not be limited, and can be changed suitably according to actual products. For example, instead of the manual for folding the origami, a manual for creating a predetermined object by combining parts or a manual for assembling a plastic model may be displayed as an animation or video.

Furthermore, if the same or similar effect or result is obtained, an order of the steps may be exchanged.

Although certain example systems, methods, storage media, devices and apparatuses have been described herein, it is to be understood that the appended claims are not to be limited to the systems, methods, storage media, devices and apparatuses disclosed, but on the contrary, are intended to cover various modifications and equivalent arrangements included within the spirit and scope of the appended claims.

What is claimed is:

1. A non-transitory computer readable storage medium storing an information processing program, wherein the information processing program causes one or more processors of a computer to perform execution comprising:
   determine whether an operation is performed on a display with an input device;
   detect a position of the operation performed on the display with the input device;
   play an animation or video on the display at a first speed when the detected position is at a first position included in an operation area of the display;
   play the animation or video on the display at a second speed when the detected position moves from the first position to a second position of the display; and
   suspend the animation or video on the display when no position is detected or the detected position is outside of the operation area of the display, the outside of the operation area including the second position.

2. The storage medium according to claim 1, wherein a user interface (UI) is displayed at a position on the surface of the display related to the operation area.

3. The storage medium according to claim 2, wherein speed of playing the animation or video can be changed based on the detected position.

4. The storage medium according to claim 2, wherein speed of playing the animation or video can be changed based on a magnitude of change of the detected position.

5. The storage medium according to claim 2, wherein the information processing program further causes the one or more processors to deform the UI when it is determined that there is a change in the detected position.

6. The storage medium according to claim 5, wherein the information processing program further causes the one or more processors to further deform the UI when it is determined that the operation by the user by the input device is not performed.

7. The storage medium according to claim 5, wherein the UI is deformed by lengthening the UI when it is determined that there is the change in the detected position.

8. The storage medium according to claim 7, wherein the UI that is lengthened is further deformed by shortening the UI when it is determined that the operation by the user by the device is not performed.

9. The storage medium according to claim 2, wherein the information processing program further causes the one or more processors to play a pattern animation in the UI when it is determined that there is change in the detected position.

10. The storage medium according to claim 1, wherein the animation or video being displayed on the surface of the display is configured to be continuously played or reversely played.

11. The storage medium according to claim 1, wherein the information processing program further causes the one or more processors to perform execution comprising:
   display on the surface of the display an image of a virtual space that is imaged by a virtual camera arranged in the virtual space;
   determine whether a virtual camera control operation, related to control of the virtual camera, by the user is performed by the input device; and
   control the virtual camera when it is determined that the virtual camera control operation is performed by the input device.

12. The storage medium according to claim 11, wherein the information processing program further causes the one or more processors to perform execution comprising determine whether a reset operation to reset the virtual camera by the user by the input device is performed, and control a position and a magnification of the virtual camera to a reference position and a reference magnification in response to having been performed the reset operation.

13. The storage medium according to claim 1, wherein the input device includes a touch panel that receives a touch input by the user, and the information processing program further causes the one or more processors to acquire input data according to the touch input, and
   determine whether the operation by the user is performed based on the acquired input data.

14. The storage medium according to claim 1, wherein the animation or video on the display is suspended until the detected position is at the first position.

15. The storage medium according to claim 1, wherein an object is displayed at the first position indicating an area of the display for user input.

16. The storage medium according to claim 15, wherein a size of the object enlarges when the detected position moves from the first position to the second position.

17. The storage medium according to claim 15, wherein a shape of the object changes when the detected position moves from the first position to the second position.

18. The storage medium according to claim 1, wherein the animation or video is continuously played while the detected position is at the first position.

19. The storage medium according to claim 1, wherein the animation or video changes from the first speed to the second speed while the position of the operation performed on the display with the input device is detected.

20. An information processing apparatus, comprising:
   a processor; and
   a memory configured to store computer readable instructions that, when executed by the processor, cause the system to:
   determine whether an operation is performed on a display with an input device;
   detect a position of the operation performed on the display with the input device;
   play an animation or video on the display at a first speed when the detected position is at a first position included in an operation area of the display;
   play the animation or video on the display at a second speed when the detected position moves from the first position to a second position of the display; and
   suspend the animation or video on the display when no position is detected or the detected position is outside of the operation area of the display, the outside of the operation area including the second position.

21. An information processing system, comprising:
   a display; and
   processing circuitry including at least one processor, the processing circuitry configured to:
   determine whether an operation is performed on the display with an input device;
   detect a position of the operation performed on the display with the input device;
   play an animation or video on the display at a first speed when the detected position is at a first position included in an operation area of the display;
   play the animation or video on the display at a second speed when the detected position moves from the first position to a second position of the display; and
   suspend the animation or video on the display when no position is detected or the detected position is outside of the operation area of the display, the outside of the operation area including the second position.

22. An information processing method, comprising:

determining whether an operation is performed on a display with an input device;

detecting a position of the operation performed on the display with the input device;

playing an animation or video on the display at a first speed when the detected position is at a first position included in an operation area of the display;

playing the animation or video on the display at a second speed when the detected position moves from the first position to a second position of the display; and suspending the animation or video on the display when no position is detected or the detected position is outside of the operation area of the display, the outside of the operation area including the second position.

* * * * *